United States Patent
Cuban et al.

(10) Patent No.: US 9,989,965 B2
(45) Date of Patent: Jun. 5, 2018

(54) OBJECT DETECTION AND ANALYSIS VIA UNMANNED AERIAL VEHICLE

(71) Applicant: Motionloft, Inc., San Francisco, CA (US)

(72) Inventors: Mark Cuban, Dallas, TX (US); Joyce Reitman, San Francisco, CA (US); Jeffrey Orion Pritchard, San Francisco, CA (US)

(73) Assignee: MOTIONLOFT, INC., San Francisco, CA (US)

(*) Notice: Subject to any disclaimer, the term of this patent is extended or adjusted under 35 U.S.C. 154(b) by 183 days.

(21) Appl. No.: 14/831,739

(22) Filed: Aug. 20, 2015

(65) Prior Publication Data

US 2017/0053169 A1 Feb. 23, 2017

(51) Int. Cl.
*H04N 7/18* (2006.01)
*G05D 1/02* (2006.01)
*G06K 9/52* (2006.01)
*G06K 9/00* (2006.01)
*H04N 5/232* (2006.01)
*B64C 39/02* (2006.01)
*G05D 1/10* (2006.01)

(52) U.S. Cl.
CPC ......... *G05D 1/0202* (2013.01); *B64C 39/024* (2013.01); *G05D 1/104* (2013.01); *G06K 9/0063* (2013.01); *G06K 9/00778* (2013.01); *G06K 9/52* (2013.01); *H04N 5/232* (2013.01); *H04N 7/181* (2013.01); *H04N 7/185* (2013.01)

(58) Field of Classification Search
None
See application file for complete search history.

(56) References Cited

U.S. PATENT DOCUMENTS

| 2013/0287261 A1* | 10/2013 | Lee | G08G 1/0145 382/104 |
| 2014/0196529 A1* | 7/2014 | Cronin | E01C 23/01 73/146 |
| 2014/0316616 A1* | 10/2014 | Kugelmass | G05D 1/101 701/8 |

(Continued)

OTHER PUBLICATIONS

Notification of Transmittal of the International Search Report and Written Opinion of the International Searching Authority, intl App. No. PCT/US2016/043619, 10 pages, dated Nov. 15, 2016.

*Primary Examiner* — James M Anderson, II
(74) *Attorney, Agent, or Firm* — Hogan Lovells US LLP

(57) ABSTRACT

An unmanned aerial vehicle (UAV) can include one or more cameras for capturing image data within a field of view that depends in part upon the location and orientation of the UAV. At least a portion of the image data can be processed on the UAV to locate objects of interest, such as people or cars, and use that information to determine where to fly the drone in order to capture higher quality image data of those or other such objects. Once identified, the objects of interest can be counted, and the density, movement, location, and behavior of those objects identified. This can help to determine occurrences such as traffic congestion or unusual patterns of pedestrian movement, as well as to locate persons, fires, or other such objects. The data can also be analyzed by a remote system or service that has additional resources to provide more accurate results.

22 Claims, 15 Drawing Sheets

(56) References Cited

U.S. PATENT DOCUMENTS

2014/0336848 A1* 11/2014 Saund .................... G08G 1/054
 701/3
2016/0070264 A1* 3/2016 Hu ....................... G08G 5/0069
 701/2

* cited by examiner

OBJECT DETECTION AND ANALYSIS VIA UNMANNED AERIAL VEHICLE

BACKGROUND

As unmanned aerial vehicles (UAVs) or "drones" become more technologically advanced, and as the entry level costs for these vehicles decreases, there is interest in determining ways to utilize these devices to solve various problems or perform various tasks. Drones are able to operate in locations and capture image views that would be difficult to otherwise obtain using conventional cameras or devices. The ability to utilize these image views is limited, however, due to factors such as the limited processing capacity, data storage, and communications bandwidth of these devices. While larger drones can be used that can support additional resources, these drones are significantly more expensive to operate and are restricted as to where and how they can operate.

BRIEF DESCRIPTION OF THE DRAWINGS

Various embodiments in accordance with the present disclosure will be described with reference to the drawings which are described as follows.

DETAILED DESCRIPTION

Systems and methods in accordance with various embodiments of the present disclosure may overcome one or more of the aforementioned and other deficiencies experienced in conventional approaches to locating and identifying physical objects. In particular, various embodiments provide mechanisms for locating objects of interest, such as people, vehicles, products, logos, fires, and other detectable objects. Various embodiments enable these items to be identified, counted, tracked, monitored, and/or otherwise accounted for through the use of captured image data. The image data can be captured using one or more unmanned aerial vehicles (UAVs), or "drones," among other such devices and systems. Various other functions and advantages are described and suggested below as may be provided in accordance with the various embodiments.

Figure 1:
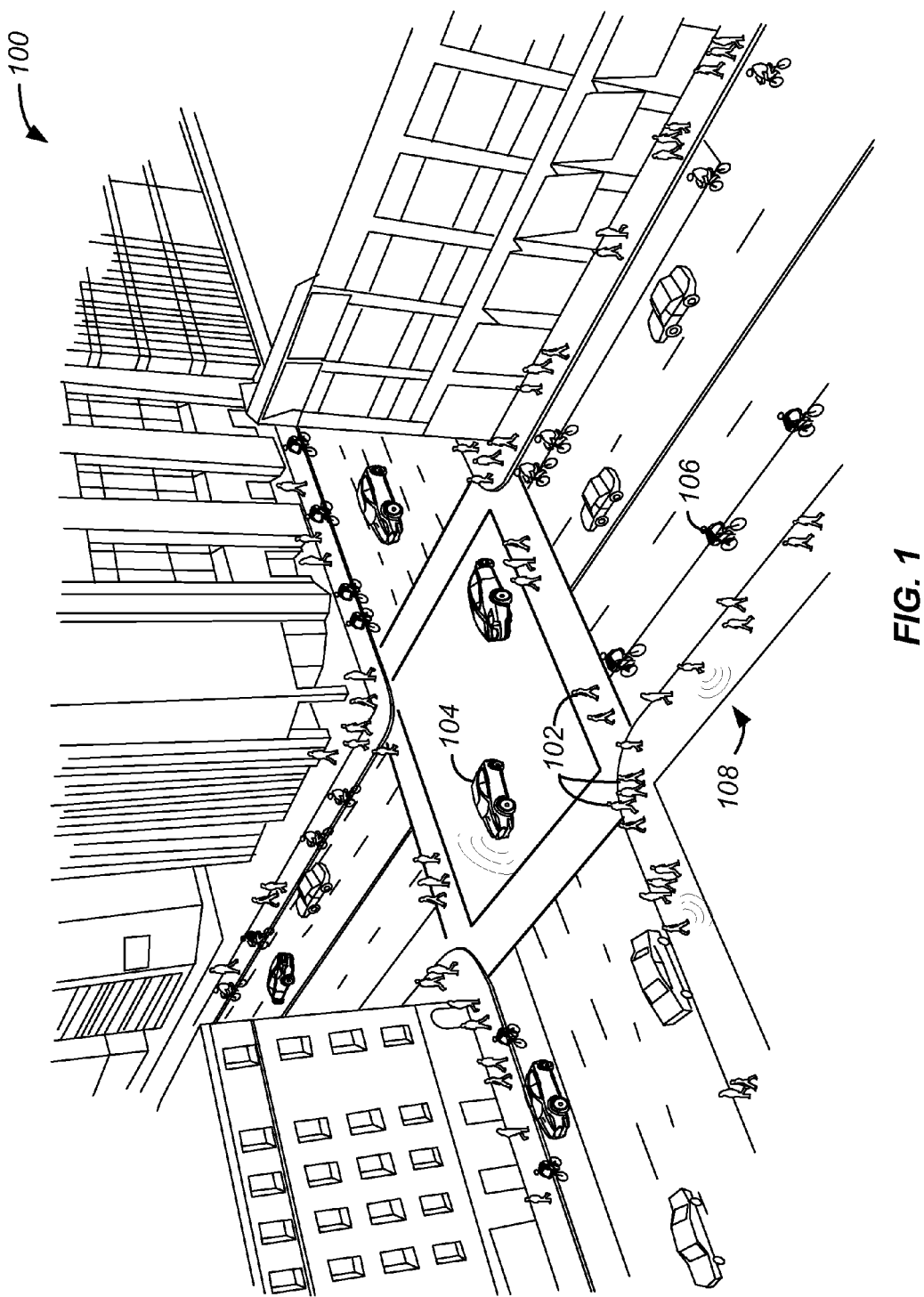
FIG. 1 illustrates an example environment in which embodiments of the present invention can be practiced.

There can be many situations where it may be desirable to locate objects of interest, such as to determine the number of objects in a given location at any time, as well as to determine patterns of motion, behavior, and other such information. As an example, FIG. 1 illustrates an environment 100 that corresponds to an urban area, such as may include roads, intersections, sidewalks, buildings, and other such features. There may be many objects that move within this environment, as may include pedestrians 102, automotive vehicles 104, bicycles 106, and the like. Some of these objects may emit audio and/or radio signals 108 or data, such as speech from a person, a detectable cell phone signal, a wireless data signal (i.e., Wi-Fi or Bluetooth®) from a vehicle or mobile device, engine noise, etc. At least some of these objects may be of interest to various persons or entities for variety of reasons. For example, a traffic agency might be interested in the amount of traffic at any given time, including summary data such as directions of traffic flow, congestion points, as well as variations in traffic over time. A traffic agency might also be interested in temporary deviations from these patterns, such as may result from accidents, events, or other such occurrences. An agency also might be interested in a breakdown of the types of vehicles, such as the percentage of vehicles that correspond to taxis or commercial vehicles versus consumer vehicles.

Similarly, a governmental or city agency or department might be interested in obtaining such information for other types of traffic, such as pedestrian or bicycle traffic. This can include determining directions of motion, congestion points, behavior patterns, density, and other such information. This information can be useful in determining, for example, places for new crosswalks or bike lanes, or changes needed to crossing lights in order to improve daily movement of the pedestrians, bikes, Segways, skateboards, and other such objects of interest. This information can also help to identify locations of interest, such as by determining when people are moving towards a certain location in greater numbers than usual, or running away from a specific location or region, among other such deviations from standard or observed behavior.

In addition to movement, traffic, and incident data that may be of interest to people such as cities or government agencies, such information can be useful to other types of entities as well. For example, an advertiser might want to know the volume of traffic (auto, pedestrian, or otherwise) that passes by a given location over time, such that the advertiser can determine where to place advertising and how much that advertising is worth. Similarly, the variations in that traffic over time can enable more targeted advertising and pricing variations throughout the day based upon variations in the amount of traffic. A person such as a retailer or restaurateur can also use such information to determine whether, and where, to open a store or restaurant in that environment based on, for example, the amount of foot traffic passing a particular location, as well as the times at which that traffic passes by. If the drone is carrying advertising, such as by towing a banner, the drone can use the data to determine a flight path whereby a maximum number of persons can have the banner within their field of view over a determined period of time.

An approach that can be used to determine this and other types of information in such an environment will be discussed with respect to FIGS. 2A through 2C. In this example approach, image data can be captured that includes one or more views of an environment 200 of interest, such as an urban center or transportation region. As used herein, image data can refer to any of various types of data, as may include one or more still images, video data, video frames or key frames, panoramic images, and stereoscopic image data, among other such options. Further, while environments such as cities and urban areas are provided as primary examples, it should be understood that rural or suburban areas, among other types of regions, can be utilized as well within the scope of the various embodiments.

Figure 2A:
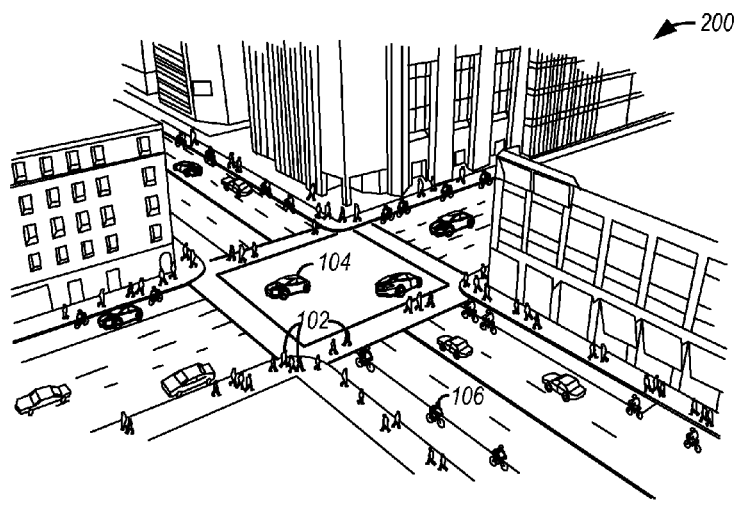
FIGS. 2A, 2B, and 2C illustrate an example process for locating foreground objects in image data that can be utilized in accordance with various embodiments.
Figure 2B:
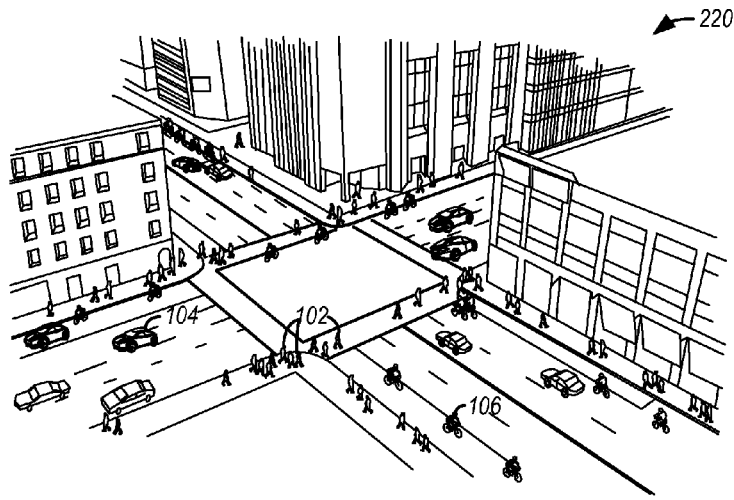
Figure 2C:

In FIG. 2A, as with FIG. 1, the example environment 200 includes a significant number of stationary objects, as may relate to sidewalks, roads, buildings, stoplights, traffic signs, bus stops, and the like. These objects that generally do not move over time can be considered background objects, such that these objects can be discerned from objects of interest in the foreground that move with respect to these background objects.

Since the objects of interest (i.e., persons, dogs, cars, bicycles) will generally move over a period of time, these objects can be identified based at least in part upon their movement in some embodiments. While approaches such as computer vision can be used to analyze an entire scene of data, such as an image of the entire environment 200 illustrated in FIG. 2A, such approaches can be relatively processor and memory intensive. If the image is captured by a device such as an unmanned aerial vehicle (a UAV, referred to hereinafter as a "drone" for simplicity, but such usage should not limit the scope of the various embodiments to specific types of unmanned aircraft or vehicles unless otherwise stated), that drone might have relatively limited processing and/or memory capacity, such that running a computer vision algorithm on full resolution, full color video data may not be possible, or may not be able to be performed with sufficient frequency for at least some applications. While the video or image data can be transmitted to a remote system or service with sufficient processing, memory, and other resource capacity for performing computer vision and object recognition, for example, the bandwidth required might exceed the available connection capacity, or a sufficient connection might not be able to be reliably and consistently obtained, among other potential issues. Further, if the analyzed data is to be used to help guide the drone to specific locations, then the latency involved in transmitting and receiving the data may be too great to be useful in various situations. Therefore, it can be desirable to minimize the amount of processing that is to be performed on the drone itself.

One way to minimize the amount of processing to be performed on the drone (or a base station associated with the drone, operations spread across a group of drones, etc.) is to remove, subtract out, or otherwise be able to ignore portions of the image data that correspond to background objects or regions. As mentioned, the background generally will remain stationary in the captured image data, at least where the image data is captured from a single point of view. For instance, the state of the environment 220 illustrated in FIG. 2B shows the locations of the objects of interest at some time t after the state of the environment 200 illustrated in FIG. 2A. As can be seen, the majority of the pedestrians 102, vehicles 104, and bicycles have changed positions and/or orientations between figures. It should be pointed out that reference numbers may be carried over between figures for purposes of simplicity of explanation, but such usage should not be interpreted as a limitation on the scope of the various embodiments unless otherwise specifically stated.

If image data is captured for both states of the environment 200, 220, and additional image data may be available for comparison, the portions of the image data that correspond to background can be determined, and those can be removed (or ignored) from the image data in order to leave remaining those portions of the image data that correspond to the "foreground" objects. If a set of images or video is available for the environment, and the environment is viewed from a determined viewpoint, then the expected pixel values for each pixel location of an image will have an average value that corresponds to the color, intensity, or other such factors of the background at that location. Although a pair of images such as those for FIGS. 2A and 2B can be used, a larger sampling of images can provide for a more accurate average value for each pixel position. If the image data for FIG. 2B has the average values for the background subtracted from the values for each corresponding pixel location, the remaining portions 240 of the image data will correspond to those portions of the image data that do not correspond to background regions or objects, as the subtraction did not result in pixel values of approximately zero. It should be understood that lighting, shadow, motion, intensity, and other factors can affect the actual values after subtraction, such that there can be a threshold or range set around a zero pixel value after subtraction such that pixels with pixel values within a threshold value of zero will be considered background in at least some embodiments. The remaining portions 240 will correspond to "blobs" of image data, or contiguous pixel regions, that each correspond to a determined foreground object, or a potential object of interest. In this way, the computer vision, object recognition, or other such process need only consider the regions of the foreground objects as illustrated in FIG. 2C, as opposed to the full image data of FIG. 2B. An advantage to looking at the image data over time and performing an average is that the process tends to minimize the effect of temporary obstructions, lighting variations, noise, and other such factors that can temporarily affect the pixel values for various locations.

Various other approaches can be used for purposes of background subtraction, or foreground detection, as well within the scope of the various embodiments. For example, some amount of image pre-processing can be performed for purposes of improving the quality of the image, as may include filtering out noise, adjusting brightness or contrast, etc. In cases where the camera might be moving, some amount of position or motion compensation may be performed as well. Background subtraction approaches that can be utilized with various embodiments include mean filtering, frame differencing, Gaussian average processing, background mixture modeling, mixture of Gaussians (MoG) subtraction, and the like. Libraries such as the OPEN CV library can also be utilized to take advantage of the conventional background and foreground segmentation algorithm.

Once the foreground portions or "blobs" of image data are determined, those portions can be processed using a computer vision algorithm for object recognition or other such process. Object recognition typically makes use of one or more classifiers that have been trained to recognize specific types of categories of objects, such as people, cars, bicycles, and the like. Algorithms used for such purposes can include convolutional or other deep neural networks (DNNs), as may utilize one or more feature extraction libraries for identifying types of feature points of various objects. In some embodiments, a histogram or oriented gradients (HOG)-based approach uses feature descriptors for object detection, such as by counting occurrences of gradient orientation in localized portions of the image data. Other approaches that can be used take advantage of features such as edge orientation histograms, shape contexts, and scale-invariant feature transform descriptors, although these approaches may not provide the same level of accuracy for at least some data sets.

Figure 3A:
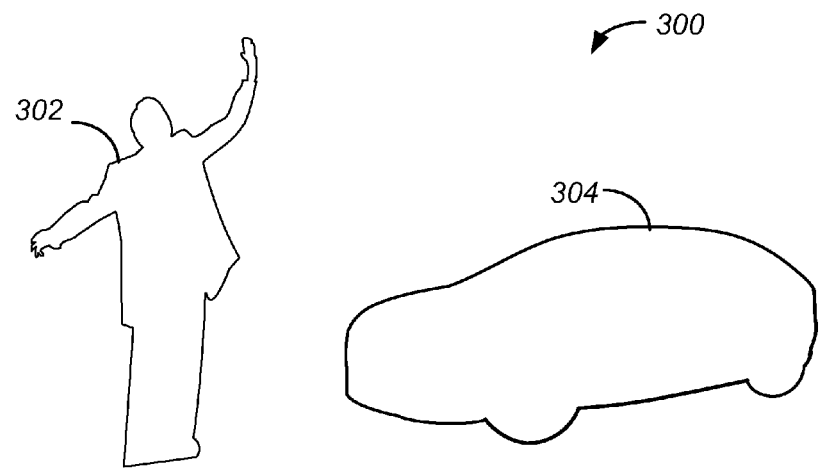
FIGS. 3A, 3B, 3C, and 3D illustrate features of objects identified in image data that can be utilized in accordance with various embodiments.
Figure 3B:
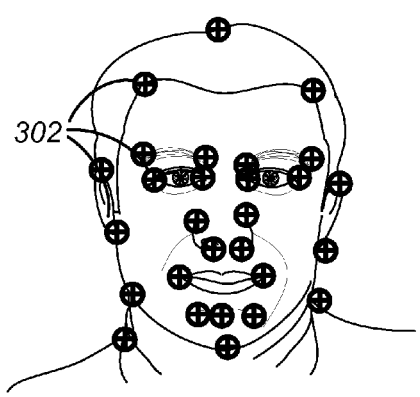
Figure 3C:
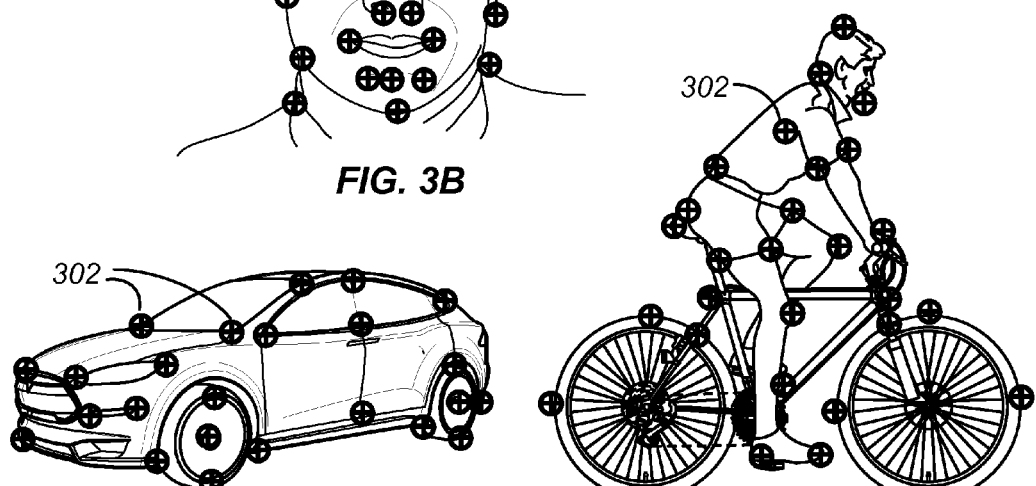
Figure 3D:
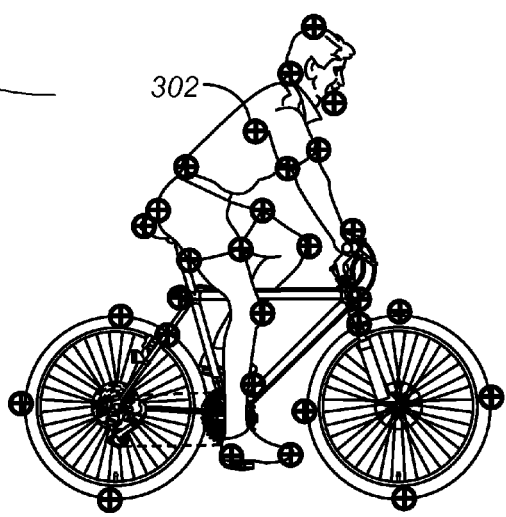

In some embodiments, an attempt to classify objects that does not require precision can rely on the general shapes of the blobs or foreground regions. For example, in the example foreground region 300 of FIG. 3A, there are two blobs that correspond to different types of objects. The first blob 302 has an outline that a classifier might indicate corresponds to a human with 85% certainty. Certain classifiers might provide multiple confidence or certainty values, such that the scores provided might indicate an 85% likelihood that the blob corresponds to a human and a 5% likelihood that the blob corresponds to an automobile, based upon the correspondence of the shape to the range of possible shapes for each type of object, which in some embodiments can include different poses or angles, among other such options. Similarly, the second blob 304 has a shape that a trained classifier could indicate has a high likelihood of corresponding to a vehicle. For situations where the objects are visible over time, such that additional views and/or image data can be obtained, the image data for various portions of each blob can be aggregated, averaged, or otherwise processed in order to attempt to improve precision and confidence. As mentioned elsewhere herein, the ability to obtain views from two or more different cameras can help to improve the confidence of the object recognition processes.

Where more precise identifications are desired, the computer vision process used can attempt to locate specific feature points as discussed above. As examples, FIGS. 3B, 3C, and 3D illustrate portions of a human, a vehicle, and a bicycle, respectively. As mentioned, different classifiers can be used that are trained on different data sets and/or utilize different libraries, where specific classifiers can be utilized to attempt to identify or recognize specific types of objects. For example, a human classifier might be used with a feature extraction algorithm to identify specific feature points 302 of a foreground object, and then analyze the spatial relations of those feature points to determine with at least a minimum level of confidence that the foreground object corresponds to a human. The feature points located can correspond to any features that are identified during training to be representative of a human, such as facial features and other features representative of a human in various poses. Similar classifiers can be used to determine the feature points 302 of other foreground object in order to identify those objects as vehicles, bicycles, or other objects of interest. If an object is not identified with at least a minimum level of confidence, that object can be removed from consideration, or a drone or other device can attempt to obtain additional data in order to attempt to determine the type of object with higher confidence. In some embodiments the image data can be saved for subsequent analysis by a computer system or service with sufficient processing, memory, and other resource capacity to perform a more robust analysis. In this way, the less resource intensive process can be used on the drone for a quick, relatively accurate determination, such as may be useful for determining a flight path for the drone, while a more robust processing can be performed by cloud servers or other such computing resources in order to determine a more accurate count or analysis of objects of interest in at least some embodiments.

After processing using a computer vision algorithm with the appropriate classifiers, libraries, or descriptors, for example, a result can be obtained that is an identification of each potential object of interest with associated confidence value(s). One or more confidence thresholds or criteria can be used to determine which objects to select as the indicated type. The setting of the threshold value can be a balance between the desire for precision of identification and the ability to include objects that appear to be, but may not be, objects of a given type. For example, there might be 1,000 people in a scene. Setting a confidence threshold too high, such as at 99%, might result in a count of around 100 people, but there will be a very high confidence that each object identified as a person is actually a person. Setting a threshold too low, such as at 50%, might result in too many false positives being counted, which might result in a count of 1,500 people, one-third of which do not actually correspond to people. For applications where approximate counts are desired, the data can be analyzed to determine the appropriate threshold where, on average, the number of false positives is balanced by the number of persons missed, such that the overall count is approximately correct on average. For many applications this can be a threshold between about 60% and about 85%, although as discussed the ranges can vary by application or situation. A situation where a drone is attempting to identify the number of people in a crowd from 400 feet in the air an utilize a threshold that is substantially lower than for a camera at ten feet that is identifying the number of people in a room, based upon factors such as resolution and effects of slight camera rotations on the captured data, etc.

The ability to recognize certain types of objects of interest, such as pedestrians, bicycles, and vehicles, enables various types of data to be determined that can be useful for a variety of purposes. As mentioned, the ability to count the number of cars stopped at an intersection or people in a crosswalk can help to determine the traffic in a particular area, and changes in that count can be monitored over time to attempt to determine density or volume as a factor of time. Tracking these objects over time can help to determine aspects such as traffic flow and points of congestion. Determining irregularities in density, behavior, or patterns can help to identify situations such as accidents or other unexpected incidents.

The ability to obtain the image data and provide data regarding recognized objects could be offered as a stand-alone system that can be operated by agencies or entities such as traffic departments and other governmental agencies. The data also can be provided as part of a service, whereby an organization collects and analyzes the image data, and provides the data as part of a one-time project, ongoing monitoring project, or other such package. The customer of the service can specify the type of data desired, as well as the frequency of the data or length of monitoring, and can be charged accordingly. In some embodiments the data might be published as part of a subscription service, whereby a mobile app provider or other such entity can obtain a subscription in order to publish or obtain the data for purposes such as navigation and route determination. Such data also can be used to help identify accidents, construction, congestion, and other such occurrences.

As mentioned, many of the examples herein utilize image data captured by one or more cameras with a view of an area of interest. In at least some embodiments these cameras can be provided using one or more drones, which can each include one or more cameras or other sensors for capturing the image data. These can include, for example, digital still cameras, digital video cameras, infrared detectors, stereoscopic cameras, thermal sensors, motion sensors, proximity sensors, and other such sensors or components. The image data can include one or more images, or video, indicating pixel values for pixel locations of the camera sensor, for example, where the pixel values can represent data such as the intensity or color of ambient, infrared IR, or ultraviolet (UV) radiation detected by the sensor. A drone may also include non-visual based sensors, such as radio or audio receivers, for detecting energy emanating from various objects of interest. These energy sources can include, for example, cell phone signals, voices, vehicle noises, and the like. This can include looking for distinct signals or a total number of signals, as well as the bandwidth, congestion, or throughput of signals, among other such options. Audio and other signature data can help to determine aspects such as type of vehicle, regions of activity, and the like, as well as providing another input for counting or tracking purposes. The overall audio level and direction of the audio can also provide an additional input for potential locations of interest. A drone may include other cameras or sensors as well, as may be used for purposes such as crash avoidance, path determination, and flight control, among other such tasks. At least some of the data from these sensors may be used to attempt to increase accuracy of the object determination process. As mentioned elsewhere herein, the sensors can also include motion and orientation sensors that can help to account for apparent movement in the image data that is a result of movement of the camera or drone used to capture the image data.

When capturing the image data as part of a monitoring process, for example, one or more drones can be configured to hover over an area of interest, or follow a regular flight path over, or around, the area of interest. Depending upon the type of area being observed, as well as other factors such as the size or weight of the drone, there might be a specific height or distance that the drone has to maintain within the area, such as a height between 100 and 200 feet, or 200 and 400 feet, although various other heights are being proposed and may vary by location and jurisdiction, etc. It may then be important for at least some applications that the drones be able to maneuver to an optimal location, or at least an appropriate location, from which to capture image data for various objects or occurrences.

Accordingly, approaches in accordance with various embodiments utilize at least some amount of object recognition and analysis on the drones themselves in order to determine changes in position and flight path that can assist in obtaining appropriate image data. This can include processes such as foreground detection and relatively simple object recognition in order to identify information such as density of objects, object movement and flow, etc. This data does not have to be incredibly accurate, but sufficient to enable the drone to determine an occurrence of a type that the drone should investigate.

Figure 4A:
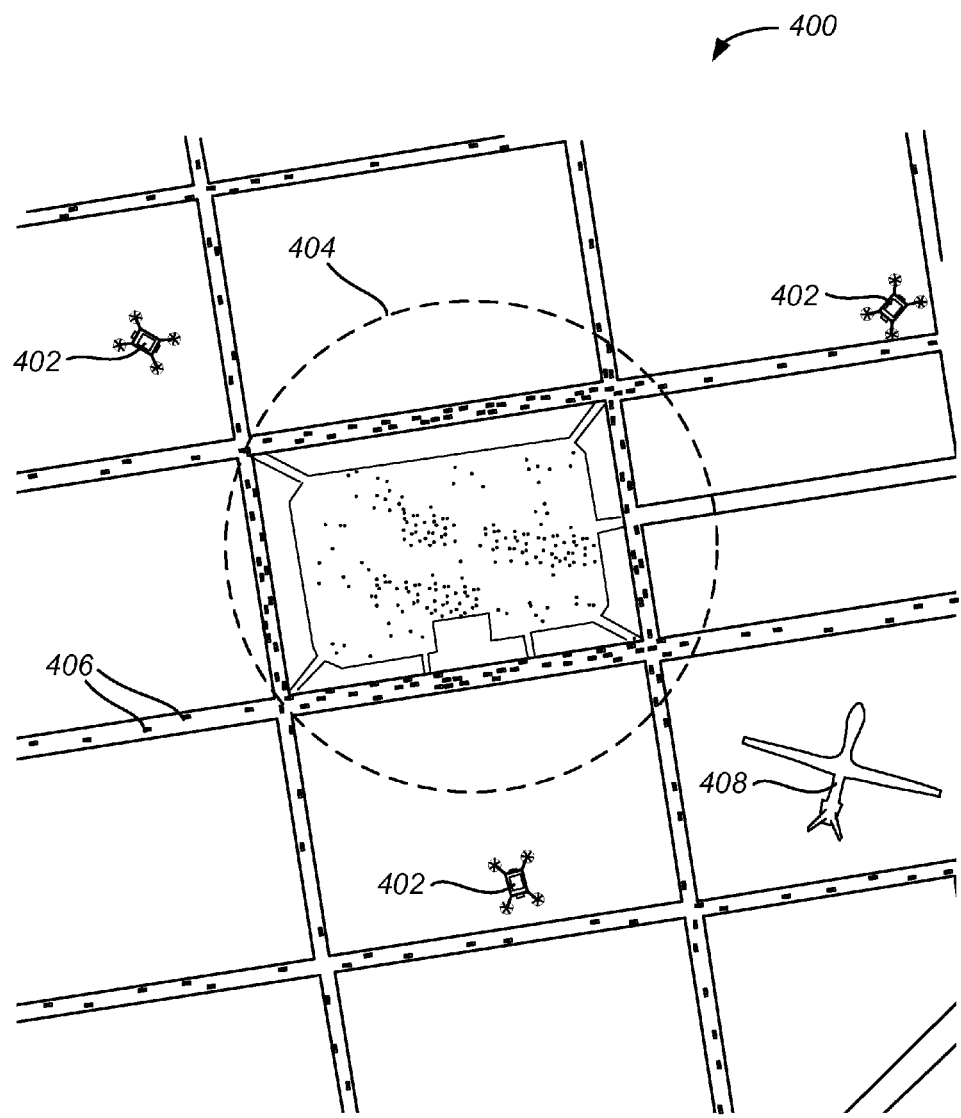
FIGS. 4A, 4B, and 4C illustrate an example approach for determining positions of interest that can be utilized in accordance with various embodiments.

For example, FIG. 4A illustrates an example situation 400 wherein a group consisting of three rotary drones 402 and one fixed-wing drone 408 is configured to monitor objects of interest in a designated region, here a nine block area of a specific city. Each drone can fly at a relatively high level for purposes of monitoring, in order to recognize objects 406 such as vehicles and pedestrians, and determine when there is a significant change in density, volume, flow, or other such aspect(s). In this example a fixed-wing drone 408 flies at a highest altitude to obtain an overview of a relatively large area, while each rotary drone 402 can fly at a lower altitude in order to obtain data over a specific section of that area. The drones 402, 408 can each do their own evaluation, can share data, or can otherwise communicate and take advantage of the views or determinations of the other drones. In this example, there is an increase in number and density of people in an area 404 associated with the main plaza. Accordingly, any or all of the drones noticing this change can, as part of a feedback loop or other such feature or process, determine whether the change warrants further investigation according to various threshold, rules, or policies in place for the drone control systems. In this example, one of the drones determines that there is a change that meets a further investigation criterion, and sends a message, request, or other set of information to the other drones, either specifically identified or within a determined region, regarding the occurrence. In some embodiments this can cause one or more of the drones to move to a location, or along a flight path, whereby the drone(s) will be able to obtain image data for views, or improved views, of the area. In some embodiments one of the drones, such as the fixed-wing drone 408 in this example, may be a "master" drone that can cause other drones to maneuver to obtain specific views or follow specific paths. In some embodiments any drone can become the master for a given situation, based upon factors such as location, altitude, configuration, maneuverability, and the like. The master drone may maintain a certain altitude, or may be a larger drone that may not be able to maneuver as closely to objects of interest, among other such options. If the people or objects in an area are densely packed in such that movement is minimal, it may be difficult to use lightweight background subtraction methods on a drone. In these situations, one or more of the drones may transmit image data to a remote system for analysis and object identification, etc. The remote system can also send back information about the identified background regions in order for one or more of the drones to update their classifiers or training data, or otherwise be able to identify background more accurately for purposes of flight path determination and other aspects discussed herein.

Figure 4B:
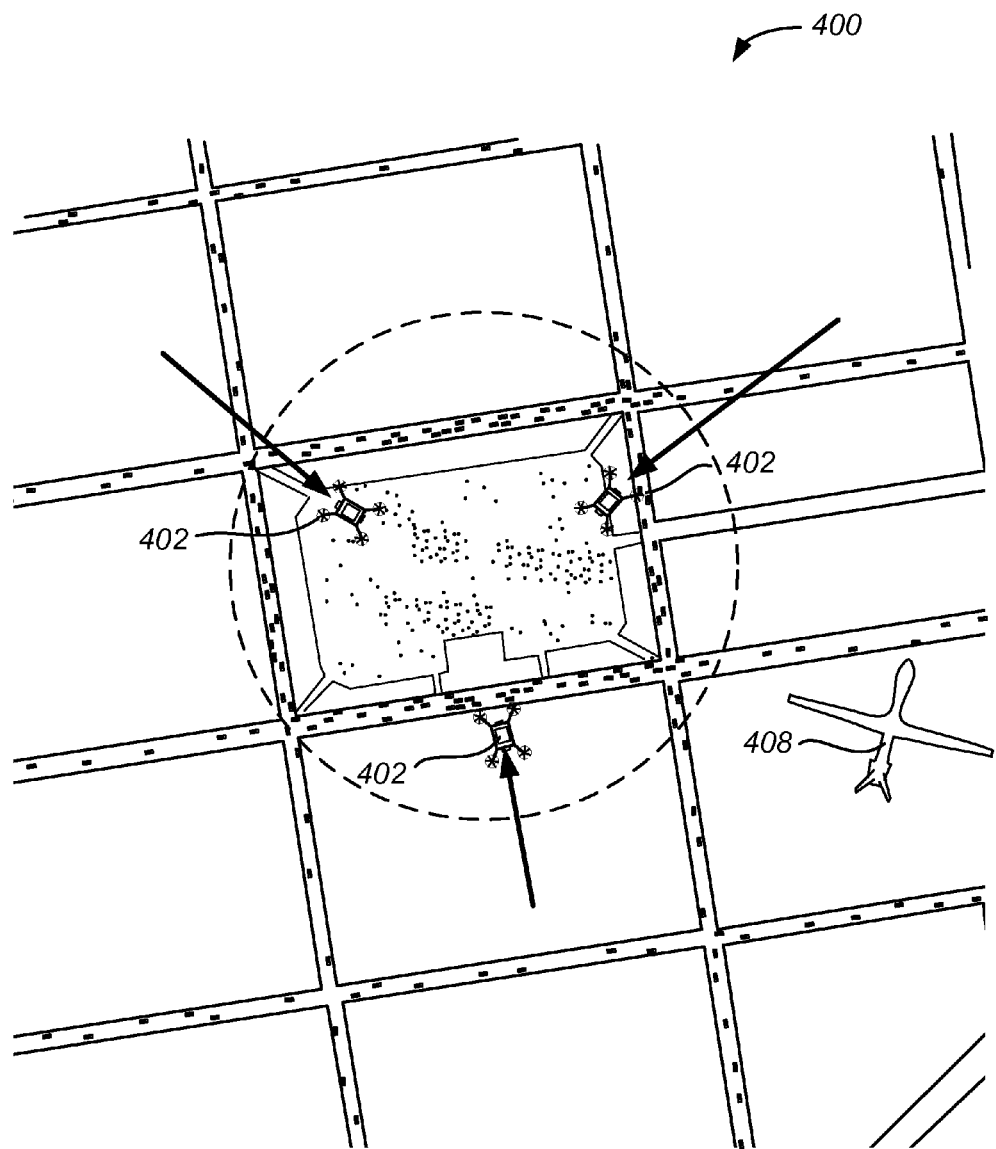

In the example situation 400 of FIG. 4B, the drones 402 coordinate (either collectively or under direction of the "master" drone 408) to move to positions whereby the drones 402 can each obtain image data for views of the plaza where the increased activity is determined to occur. In this example, each drone is assigned to a specific portion of the area, such that different views of the plaza can be obtained without unnecessary overlap or causing the drones to fly too closely to each other. While the drones can be equipped with collision avoidance systems and other such components, the drones can also be configured to fly based upon fields of view of their respective cameras, such that a maximum amount of unique data can be obtained from the drones that are present. Other approaches can be used as well, such as to cause drones to capture overlapping or redundant data for purposes of improving accuracy and precision, etc. As mentioned elsewhere herein, the different views can also be utilized to obtain three-dimensional data and/or multiple views of objects of interest.

Figure 4C:
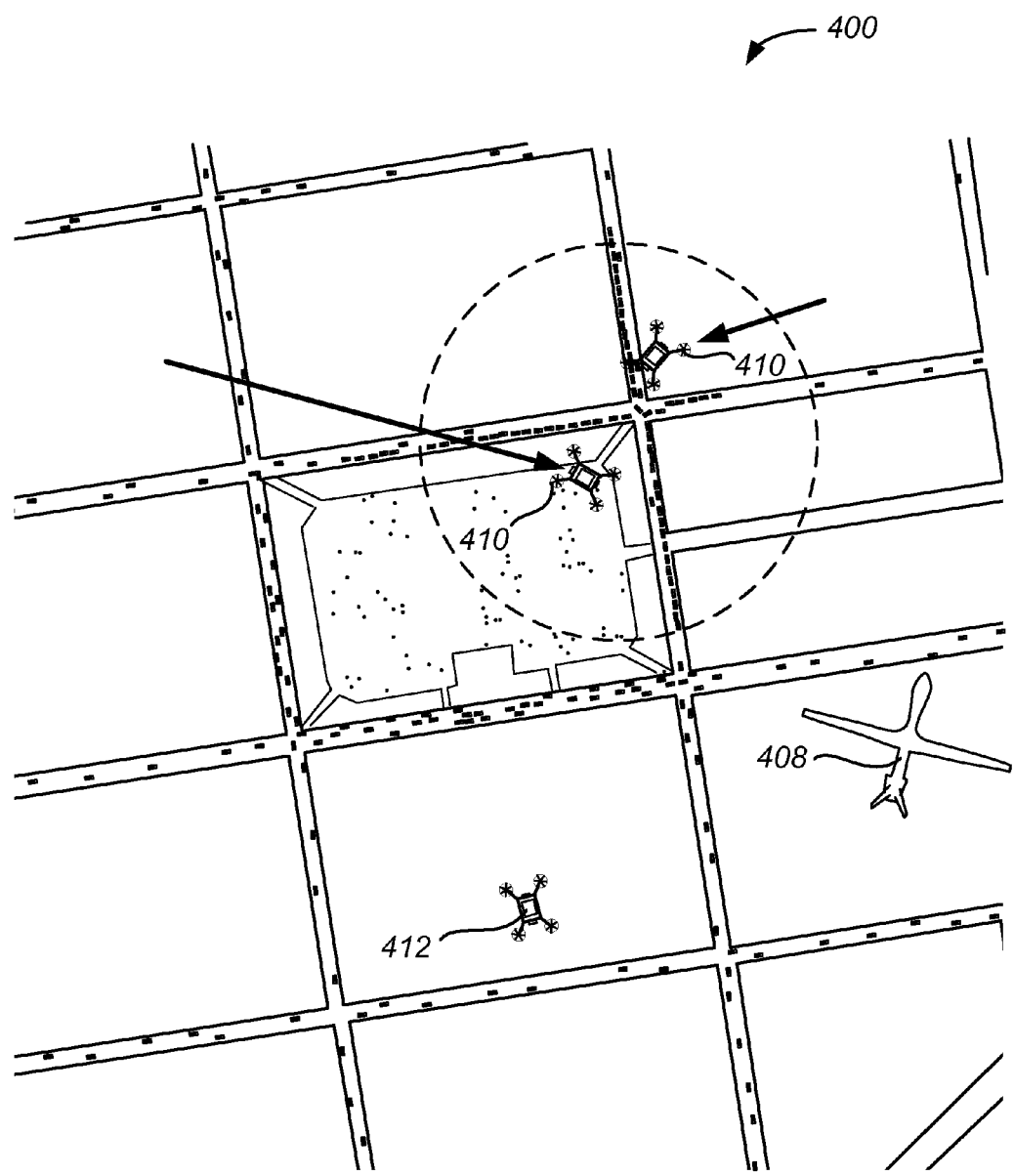

FIG. 4C illustrates a similar example situation in the same location wherein traffic congestion is detected in a specific region. The detection can be the result of a density of vehicles exceeded a determined threshold, the traffic pattern falling outside a normal range, an amount of noise matching a congestion pattern, and/or other such factor(s). In this example, the master drone 408, which might have more processing and memory capacity than the rotary drones, can determine to send a subset of the drones 410 to investigate the incident or irregularity. While all drones in the area can be directed to obtain additional information in some embodiments, in this example the master drone 408 determines the number of drones to move to that area based upon factors such as the size of the area of the incident, the type of incident, the relative location of each drone, the confidence that the incident is an actionable incident, etc. The drones 410 can then move towards the determined location and capture image/sensor data for the location, which can be analyzed on the drones 410 themselves, communicated to the master drone 408, and/or communicated to a remote system for analysis. As congestion increases, decreases, or shifts in location, drones can be reallocated as appropriate. The drones 410 can use information about the direction of the congestion, and movement of vehicles in other directions, to determine the likely location of the cause of the congestion in order to attempt to obtain additional views and information for, and around, that location. One of the other rotary drones 412 that is not directed to investigate the incident can continue along its current path or can be directed to hover in a specific location to obtain overview information, among other such options.

Figure 5A:
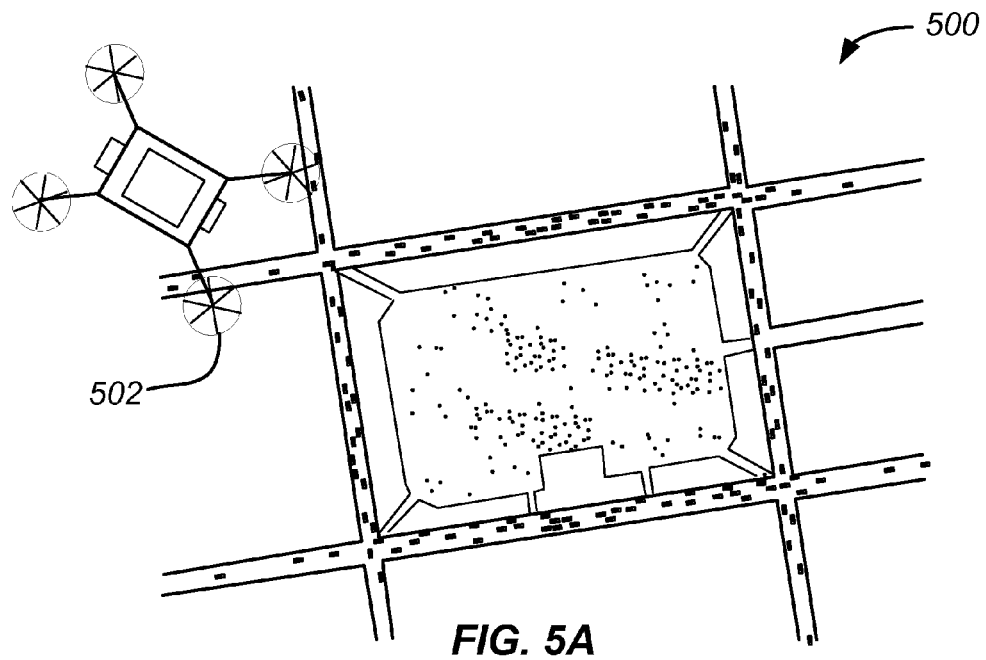
FIGS. 5A, 5B, and 5C illustrate another example approach for obtaining additional data for specific objects or positions of interest that can be utilized in accordance with various embodiments.
Figure 5B:
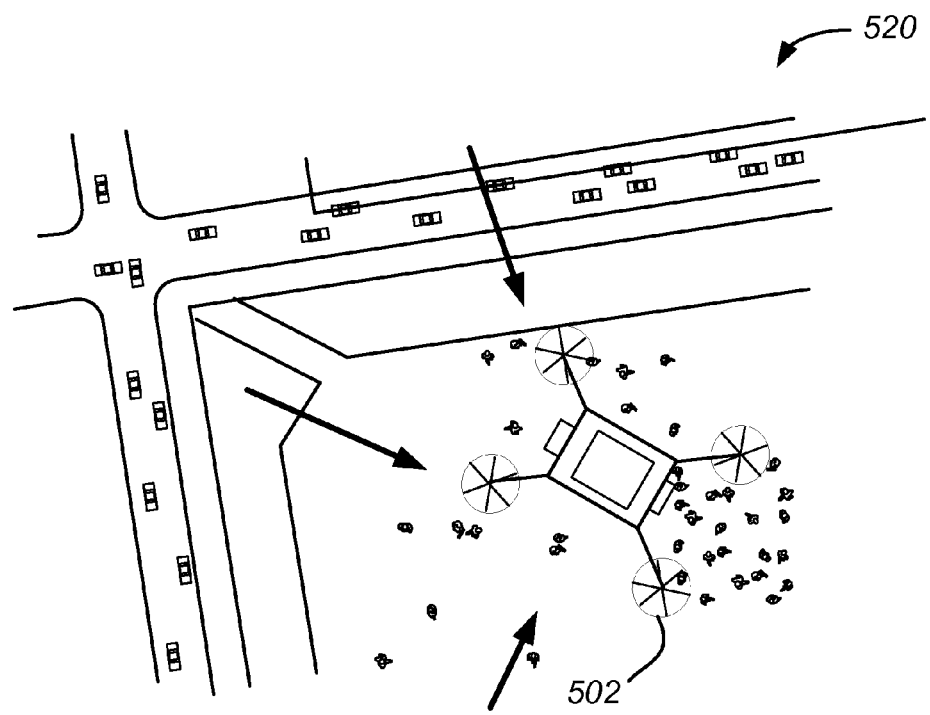

Even in situations without multiple drones, a single drone can utilize object determinations to adjust the flight path or determine areas for further investigation. For example, in the situation 500 of FIG. 5A a single drone 502 might be following its standard flight path over a city, then determine that there is unusual activity in a certain area or location. In some embodiments the drone may be configured to automatically move towards that area in order to obtain additional information. In some embodiments the drone may first analyze the data to determine whether the information obtained for the area meets a minimum confidence threshold, such that the objects are being identified with an acceptable level of accuracy. If so, the drone can continue its flight path or otherwise maintain its current altitude. If the information obtained does not meet a threshold or criteria, or if there is a different threshold for unusual activity, the drone can analyze the situation and determine an appropriate location or path to follow in order to obtain additional information to increase the confidence values. This can include, for example, translating to the appropriate area (or as close as possible, respecting distance regulations and no fly zones, for example) and dropping to an altitude, such as near a minimum allowable altitude, whereby the drone can capture a larger, higher resolution view of the objects as illustrated in the example situation 520 of FIG. 5B. As mentioned, in some embodiments the drone may be limited in its proximity to humans, for example, such that an appropriate location or flight path should be determined to enable the camera to get as close to the objects as possible, or at least practical, while observing all corresponding regulations.

Figure 5C:
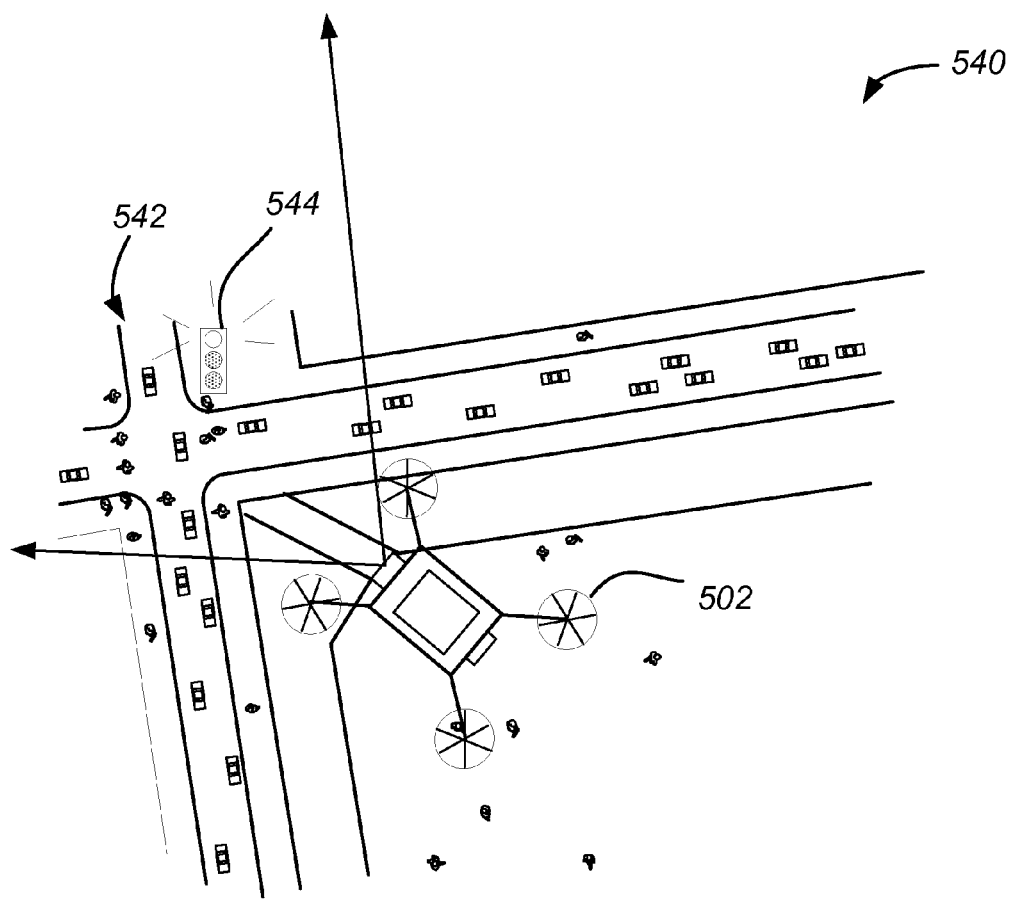

In some embodiments a drone can be configured to monitor a certain location or type of location. For example, in the example situation 540 of FIG. 5C a drone 502 is instructed to monitor one or more intersections over a period of time. This monitoring can include determining the presence and locations of objects such as pedestrians, bicycles, and vehicles, and tracking their movement. The monitoring can also involve determining factors such as the state of a traffic signal or cross-walk signal. The drone can analyze the captured information to determine when pedestrians or bicycles are crossing with or against the light, as well as how fast vehicles are moving through the intersection and how many vehicles pass through the intersection against the light. This information can determine potentially dangerous intersections, and the ways in which those intersections are dangerous. For example, the drone data might indicate that vehicles in a first direction at a first intersection tend to speed through the intersection, and at a second intersection pedestrians and bicycles might cross against the light more than normal. And these patterns might vary by time of day and day of the week, based on when people are commuting, etc. This information can then be analyzed, such as by a backend system, to identify potential dangers such that mechanisms can be put in place to reduce those dangers and prevent accidents or other such undesired occurrences. In some embodiments this can be provided as part of a monitoring service, whereby a city or community can request the monitoring be done over a period of time for a particular area or set of locations, and the resulting data or analysis of the data can be provided at appropriate times.

It should be noted that directly overhead views may not be optimal in at least some situations. For example, it may be difficult to identify a person wearing a hat or holding an umbrella when flying directly over that person. A view such as a side or perspective view, which can provide at least some feature points for the user's face or pose, maybe preferred in at least some embodiments. Accordingly, the flight control software might determine the locations of the objects of interest, then determine the appropriate flight plan to use to obtain the desired views of those objects of interest. Further as mentioned, in some embodiments it may be desirable to capture views of objects from multiple angles in order to improve confidence levels. For example, a view of a person from the front, where the face is visible, may provide the highest level of confidence for a human object where a view from the side might be the optimal location for a bicycle, such that it may be desirable to obtain multiple views, or at least move around an object of interest until a minimum confidence level is obtained.

Figure 6:
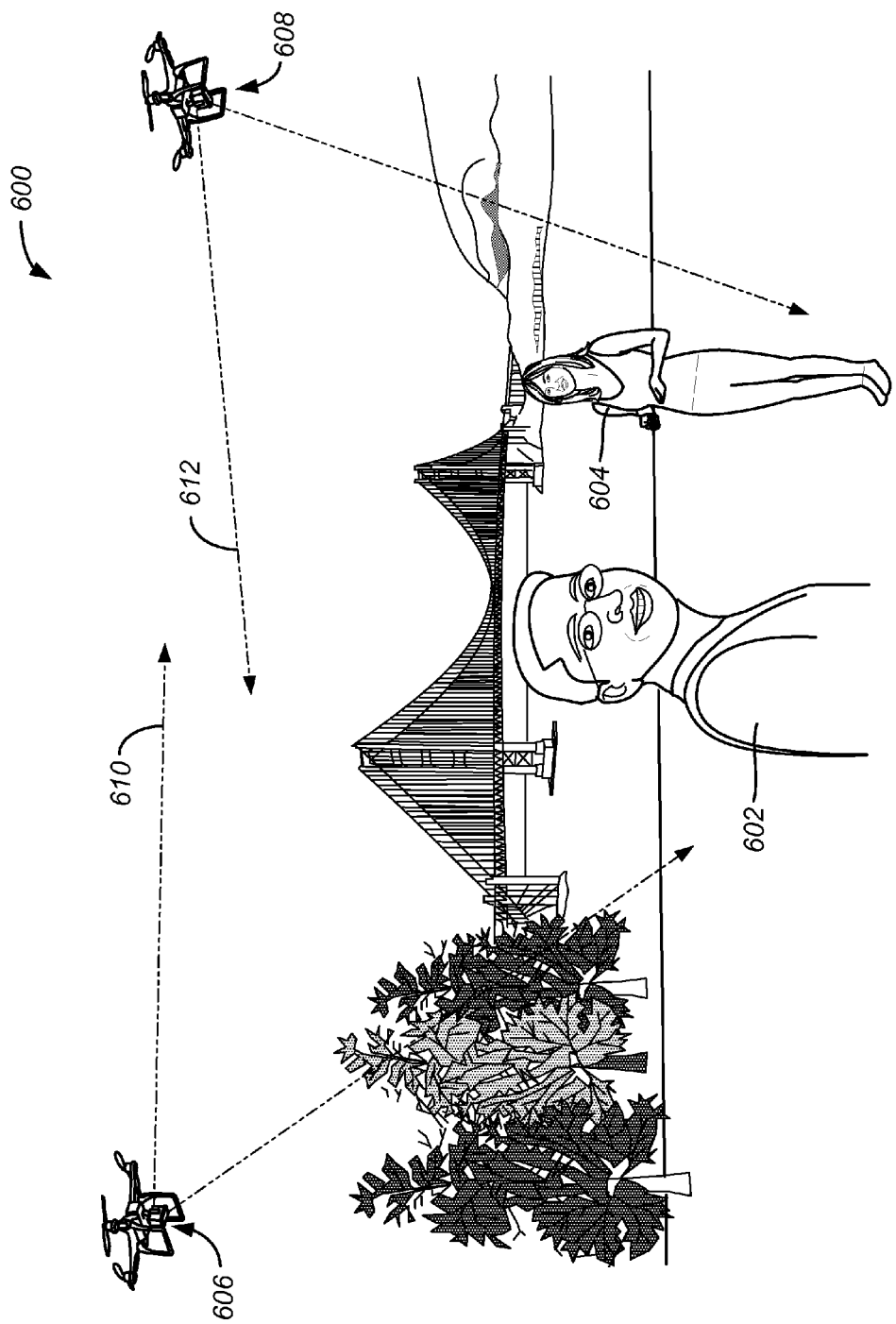
FIG. 6 illustrates an example situation wherein image data is captured from multiple angles to provide enhanced image data that can be utilized in accordance with various embodiments.

Multiple views can be obtained using a single drone with an appropriate flight path. While this can help to identify objects, the time needed to maneuver to the various views can enable the objects to move, rotate, or leave the area such that it may not be possible to obtain the various views. Accordingly, for a single drone the system can be configured to use as much data and as many views of an object as may be available. If two or more drones 606, 608 are available for an area, as illustrated in the example environment 600 of FIG. 6, those drones can be configured to concurrently capture image data representing different views of one or more objects of interest. The data can be time synchronized such that the corresponding views can be correlated, enabling more accurate determination of objects and potentially the generation of three-dimensional models or representations of the objects. Further, the ability to obtain two different views from determinable viewpoints enables the capturing of stereoscopic image data, whereby the disparity provides information about distance and scale. For example, the people 602, 604 in FIG. 6 are both contained within the fields of view 610, 612 of the cameras of the respective drones 606, 608. If, using sensors such as position sensors, geographic sensors, altimeters, proximity sensors, and/or other such sensors, the drones 606, 608 are able to determine their relative positions, the data captured by each camera can be correlated to provide disparity information that varies with distance. By knowing the optical properties of the camera assemblies and relative positions, the disparity data can be used to obtain distance and dimension data for the people 602, 604 and other objects in the scene. The dimension data can help to increase the confidence in the objects of interest. For example, if the object being identified is a doll or action figure that is only three inches tall, then even though the feature recognition process might identify the action figure as a human with a minimum level of confidence, the dimensions can indicate that the object is actually not an adult human. Similarly, if the object is a twelve foot tall statue, the dimension data can be used to rule out the possibility, at least with a very high likelihood, that the object is an adult human. Various other features can be used to improve confidence in other embodiments as well, such as color analysis and the like. For example, if a statue object is monochrome bronze then the statue can be ruled out as a human with high likelihood even if the feature points match a human object according to the appropriate classifier. Other sensors that are capable of identifying heat signatures or other data indicative of a human object can be used to increase confidence as well within the scope of various embodiments.

Figure 7A:
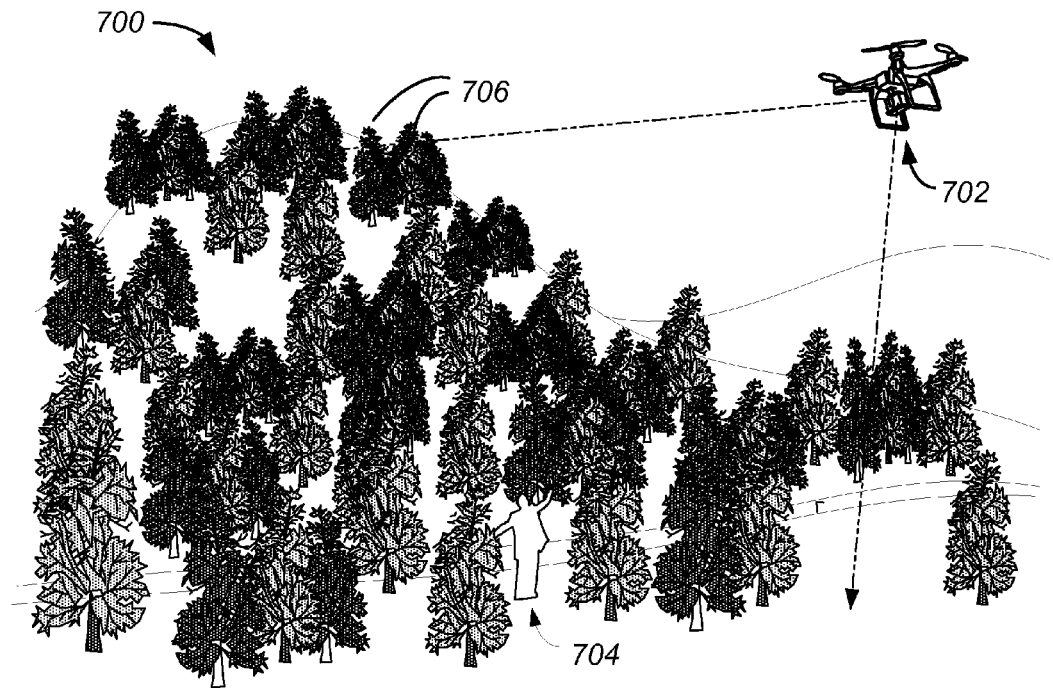
FIGS. 7A and 7B illustrate example situations wherein objects or situations can be detected in accordance with various embodiments.

The ability to quickly recognize objects from a drone, as well as the ability to utilize different types of data to make those determinations, can provide significant value in other situations as well. For example, in the situation 700 of FIG. 7A a drone 702 is flying over a forest as part of a search and rescue operation. In this case, the density of the trees can make it difficult for the drone to get a sufficient view of a person to make the determination with a high degree of confidence based on image data from a flight altitude alone. Using approaches discussed and suggested herein, the drone could fly over the area capturing image data to do quick foreground separation and image analysis to attempt to determine any objects that match a human with even a very low confidence level, such as may be enough to avoid noise and excessive false positives but sufficient to identify a potential human when only a portion of that human is visible. In security operations, the drone may not be looking for a particular person but any person in an area at a particular time, whereby the drone can perform an action such as to attempt to recognize the person, send image data to security personnel, sound an alarm, or perform another such action.

In addition to image data, heat signature data can be captured and analyzed concurrently in order to attempt to improve the confidence in human detection determinations. A relatively low level of confidence, such as at least 20% confidence, may be sufficient to cause the drone 702 to change a flight path to be able to move closer to the potential object of interest 704 and capture a larger and/or higher resolution view of the object. The ability to perform quick object recognition on the drone and combine this with heat signature or other such data can enable the drone to scan a large area and move into any regions that contain a potential object of interest. The drone can continue in a direction towards the object 704 until the confidence level drops below a minimum amount or the object is identified as a different type of object. In other embodiments, the drone can continue towards the object 704 at least until sufficient time as the object is identified with a sufficient level of confidence that the object has been recognized as a person. In some embodiments a facial recognition process or other such process can be used to attempt to actually identify the located person as the person of interest. If the person is identified as the person of interest, an appropriate action can be taken, such as to send a request for rescue or at least send a notification that the person has been located. The coordinates of the person and/or drone also can be sent in at least some embodiments. High resolution image data can be transferred to a remote system to help with the determination as well, where that system may have more processing power and more advanced facial recognition algorithms, or other such resources. In some embodiments where the drone is of sufficient strength and power, and where the person is able to be moved, the drone can also potentially be caused to lift the person out of the area and transport them to a designated location.

Figure 7B:
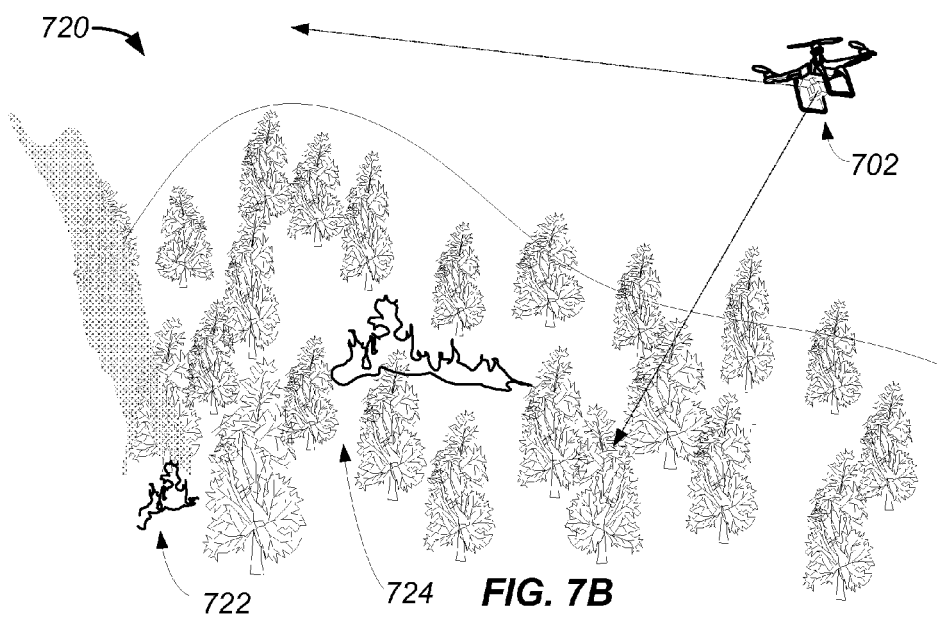

The ability to utilize heat signatures and train classifiers (or HOG descriptors, etc.) for certain types of objects can enable other types of determinations and uses as well. For example, in the situation 720 of FIG. 7B there are a few isolated fires 722, 724 burning in a remote forest. The ability to have drones flying over the forest and quickly detect small fires soon after they start can help the fires to be fought before those fires become unmanageable. If possible, the drone can also potentially drop extinguishing material in order to put out the fire while such an approach may still be effective. As with other embodiments discussed above, the drone can also communicate wirelessly with other drones to cause those drones to move to the area to help drop extinguishing material as well. If such capability is not present, the drones can at least capture additional image information (as may include visual and heat signature data) in order to help provide information about the current state of the fire in order to help guide firefighters to the appropriate locations. Classifiers can be trained to detect smoke, flames, heat signatures, or other objects that may be indicative of fires or other such occurrences. In at least some embodiments the drones can be directed to move towards the area until sufficient information is available to determine the size of the fire, as well as the presence of humans near the fire and the type of activity of those humans, in order to determine whether the fire is likely a campfire or other contained fire that does not require attention. In at least some embodiments image data for such a fire may be transmitted to a specific location or address for review by a human just to ensure that the fire does not require any type of official action. Drones can also be coordinated to fly in the area around the fire in order to identify streams, cliffs, or other features that may naturally stop the spread of the fire in a particular direction, in order to help guide the fire teams to locations where they can be most effective. The ability to locate rivers and cliffs can also help guide the firefighters along a path where they will be able to pass without significant effort or deviation required. A drone can analyze potential paths and communicate whether ground access is possible or whether only air access is possible. The drones can also scan the area for humans, structures, or other objects that might be at risk from the fire(s).

Figure 8A:
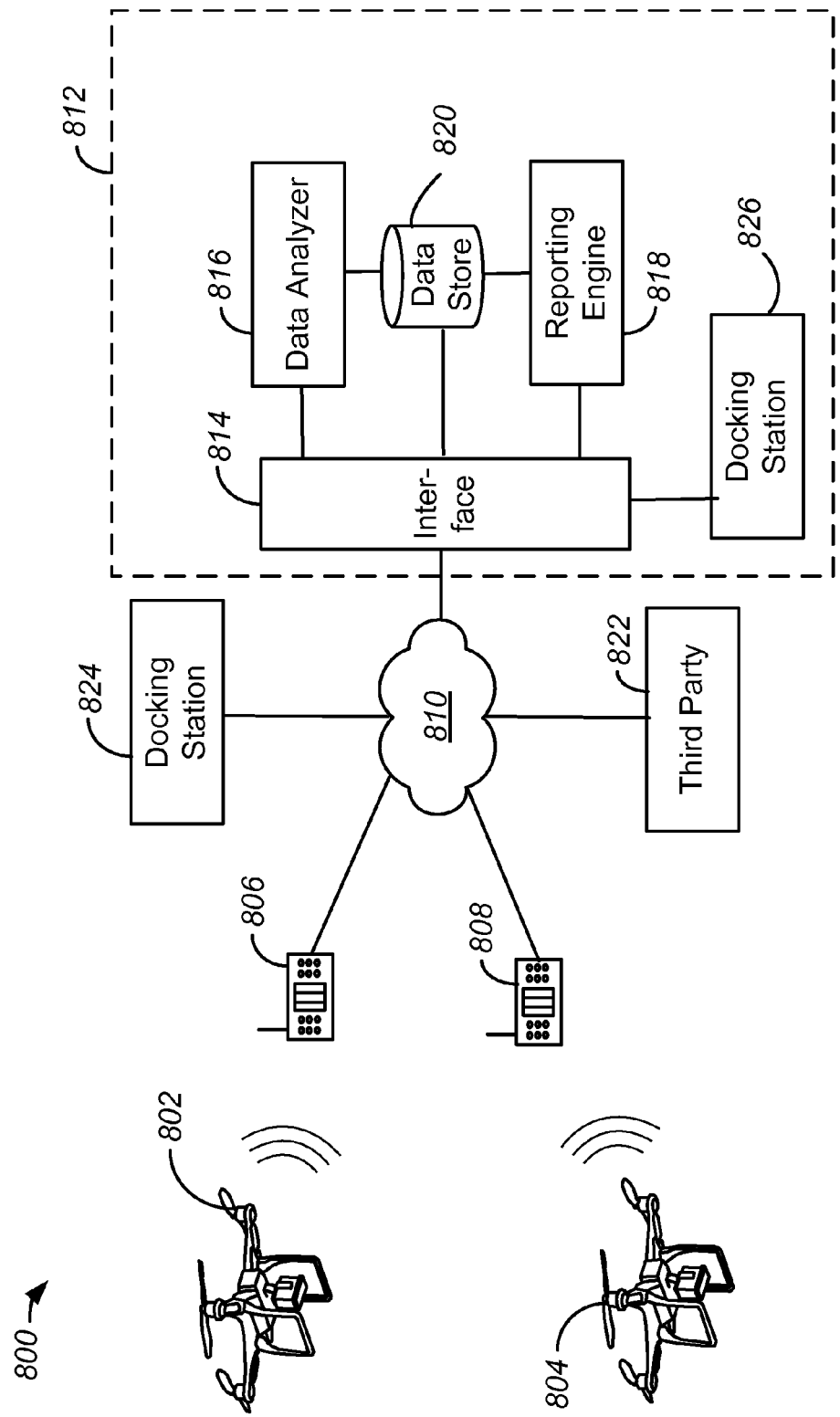
FIGS. 8A and 8B illustrate systems and devices that can be utilized to implement aspects of the various embodiments.
Figure 8B:
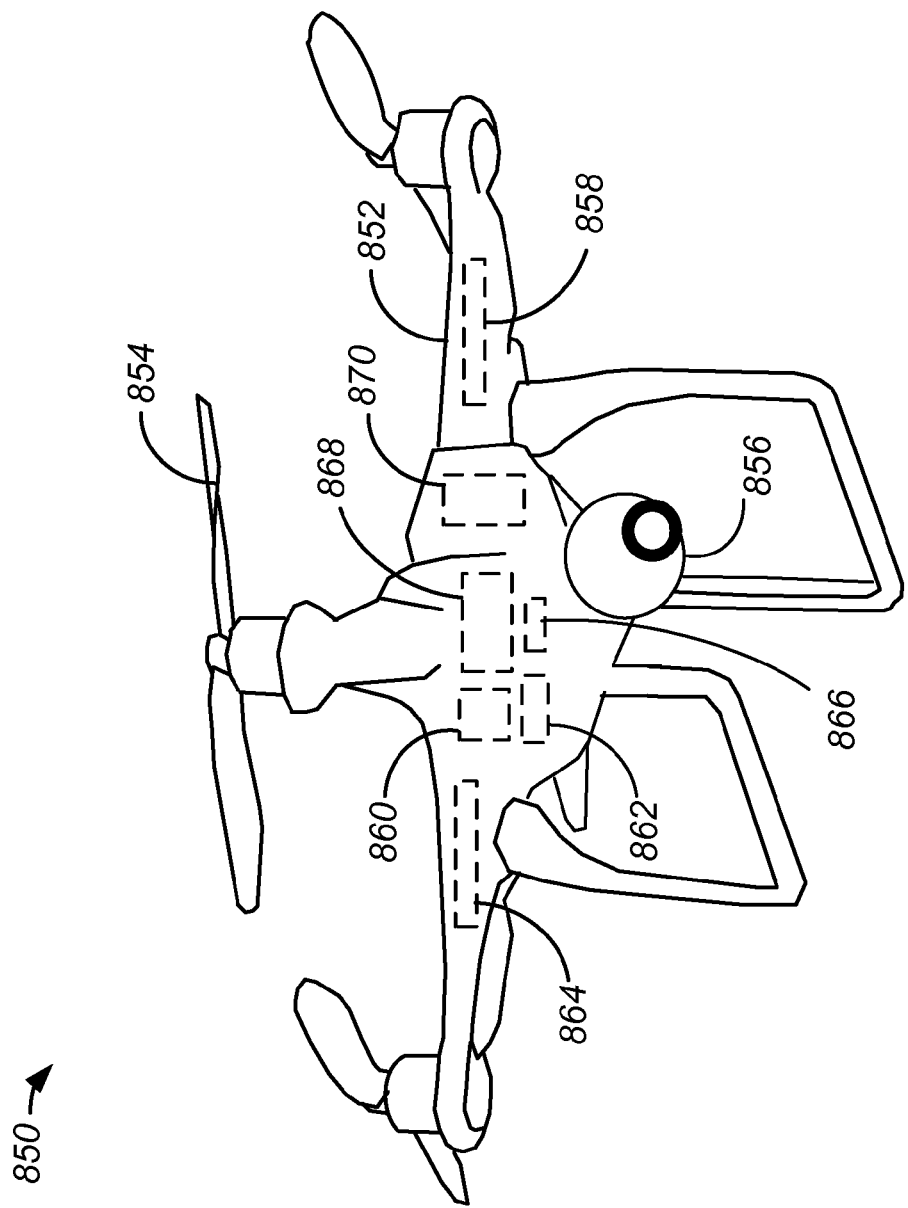

As mentioned, in various embodiments there can be at least some processing performed on the drones, while at least some of the processing can be performed using a remote system or service. An example of such an environment 800 is illustrated in FIG. 8. In this example, two drones 802, 804 are each able to capture image data to be processed by a service offered using resources of a resource provider environment 812, such as a cloud environment offered by a resource provider. The drones may be of the same or different types, operated by the same or different entities and providing similar or different types of information from similar or different areas. Each drone can communicate wirelessly with one or more base stations 806, 808, either the same or different station operated by the same or different entities, which can cause information to be transmitted across at least one network 810 to be received by an interface layer 814 of the resource provider environment 812. The network 810 can be any appropriate network, such as one or more wired or wireless networks as may include a cellular network, the Internet, an intranet, a local area network (LAN), and the like. The data transmitted can include any appropriate data discussed or suggested herein, as may include image data, position data, sensor data, identifier data, object description data, and the like.

The data can be received to an interface, such as an application programming interface (API) or other such interface of the interface layer 814. The interface layer can include any of a number of components known for receiving and routing information in an environment, as may include various routers, load balancers, network switches, and other such components. The data can be stored to a data store 820 or other such repository for analysis by a data analyzer 816 or other such system, service, component, application, or device. In some embodiments where the data relates to routine monitoring, the data may be analyzed at specific times or intervals. In embodiments where the data relates to specific events or occurrences, or whether otherwise indicated by the data or message received from the drone, the data analyzer might load the data into resident memory and analyze the data immediately, or as soon as possible within the context of the environment. The data analyzer can perform various analytical tasks discussed and suggested herein, such as to count objects of interest in certain locations over time, search for patterns in object movement, perform more accurate object determinations, and the like. For routine monitoring and other non-critical data, the results can be stored back to the data store 820 (or a different data store or repository) for subsequent retrieval by a component such as a reporting engine 818, which can aggregate the relevant data and generate a report or other such output that can be provided to a third party 822 or other entity who may have subscribed to the service or otherwise paid or obtained the rights for such a report. For critical data, such as for a fire, accident, or other such occurrence, the reporting engine might be notified by the data analyzer right away, such that the reporting engine can quickly send a notification to the appropriate entity or entities, such as a police department, ambulance dispatch, fire department, etc. Various other reports can be generated as well as would be apparent to one of ordinary skill in the art in light of the teachings and suggestions contained herein. The data can be stored over time for subsequent analysis and comparison, as may be useful in determining trends or patterns that can be based at least in part upon historical behavior data or other such information.

In some embodiments a drone 802 can be received to a docking station, which can be an internal docking station 826 of the resource provider environment or an external docking station 824 that may be provided by a customer or a third party. In the docking station the drone can recharge its batteries and have any appropriate maintenance or other such service performed. The drone also can connect to the docking station in order to transmit data to and from the data analyzer 816, data store 820, or other such location. In some embodiments the drone will upload all its image and sensor data to the resource provider environment over a wired data connection of the docking station. The drone can also receive data from the environment 812, such as new configuration data, trained models, flight paths, and the like. The drone also can have various other tasks performed while in the docking station, such as may include data removal, virus scanning, software updating, and the like.

A drone, remotely piloted aircraft (RPA), or unmanned aerial vehicle (UAV) can include various cameras, sensors, and other components that enable the drone to capture and transmit the relevant data. An example of such a drone 850 is illustrated in FIG. 8. In this example, the drone is a multi-rotor, fixed-pitch aircraft, such as a quadcopter with four separate motors and rotors 854, although fixed wing designs with launch mechanisms and other types of aircraft can be used as well within the scope of the various embodiments. The method of flight and types of engines, flight mechanisms, and launch mechanisms are not critical to at least some of the embodiments, as many embodiments instead rely only on the drone having the ability to maneuver to a determined location as may be determined by an appropriate flight control system. While the drone can be guided by remote control in some embodiments, in other embodiments the drone is controlled autonomously by an onboard computer and/or control system.

In this example the drone has a housing 852 made out of a lightweight material such as a polymer, fiberglass, or carbon fiber material, although various other materials can be utilized as well that provide for strength and durability while adding as little weight as possible. The drone will include at least one camera 856 for capturing image data within a capture range of the drone. The camera can be any appropriate camera, as may include a complementary metal-oxide-semiconductor (CMOS), charge coupled device (CCD), or other such sensor or detector capable of capturing light energy over a determined spectrum, as may include portions of the visible, infrared, and/or ultraviolet spectrum. The camera may be part of an assembly that includes appropriate optics, lenses, focusing elements, shutters, and other such elements for image capture by a single camera, set of cameras, stereoscopic camera, or other such configuration. The camera can be configured to perform tasks such as autofocusing, zoom (optical or digital), brightness and color adjustments, and the like. As mentioned, the drone can include at least some amount of memory 866 for storing at least a portion of the image data, at least temporarily on the drone. The data can be stored at least until such time as one or more processors 860 of the drone are able to analyze at least a portion of the data and/or at least a portion of the data is able to be communicated, via a wireless communication device 870, to a base station or remote system or server for analysis. The memory can include any appropriate memory, or combination thereof, as may include flash memory or another such non-transitory, non-volatile computer-readable storage medium. The memory and/or data storage on the drone may also include devices such as memory cards, USB flash drives, solid state drives, RAM, optical drives, magnetic drives, and the like.

In order to operate the drone, the processor can work with a flight control system 868 that can be charged with determining the direction of flight for the drone and sending the appropriate signals to the motor(s) for the rotors 854 or other flight mechanism in order to cause the drone to move in the desired direction. The control system can utilize flight path data stored in memory 866, as well as dynamic decisions made by the processor(s) 860 or instructions received over the wireless communication device 870, among other such options. The motor(s) can be any appropriate motor used for such aircraft, as may include brushless motors for smaller drones to more conventional aircraft motors for larger aircraft. There can be various other drive mechanisms, control systems, balancing components, or other elements used with such systems.

The example drone 850 also includes one or more motion and/or orientation sensors 864. These can include, for example, gyroscopes, electronic compasses, inertial sensors, accelerometers, magnetometers, and the like. These sensors can be used to determine motion of the device, which can help provide feedback to the control system 868 as well as to provide information to the processor(s) 860 about changes in location and orientation of the drone, which can be used to remove, or account for, apparent motion in the image data as a result of the drone. The camera 856 may include image stabilization components and/or software, but these only account for small vibrations, shaking, or variation in point of view. By knowing changes in orientation and position from the appropriate sensor(s), changes in position of objects in the image data can be accounted for when those changes are due to motion of the drone. This can help to determine background regions, for example, where the background separation process relies on background that does not significantly change over time but due to motion of the drone the background would change in the captured image data. The ability to subtract out the effects of the motion, for example, can enable the background image data to be identified as not moving over time. As an example, if the drone translates in one direction that would cause a ten pixel shift a first direction in the image data, the position information in the image data can be shifted by ten pixels in the other direction to account for the movement. A similar effect would be experienced with rotation, where the angular change would affect the image data by a determined angular extent. If the approximate distance to the objects of interest is known, such as from an altimeter or other such component, then the image data can be compensated accordingly. Various other motion adjustments can be performed on the image data as would be apparent to one of ordinary skill in the art in light of the teachings and suggestions contained herein.

The drone can include other components as well, such as one or more rechargeable batteries 862 or other such power sources, as may receive power from solar, wireless, or other such sources while in flight. The drone can also include a proximity sensor 858, ultrasonic sensor, or other sensor capable of detecting the proximity or location of objects to assist in crash avoidance. Other components can be used as well, such as may include autopilot systems, airspeed sensors, propeller balancers, crash support elements, and the like.

Figure 9:
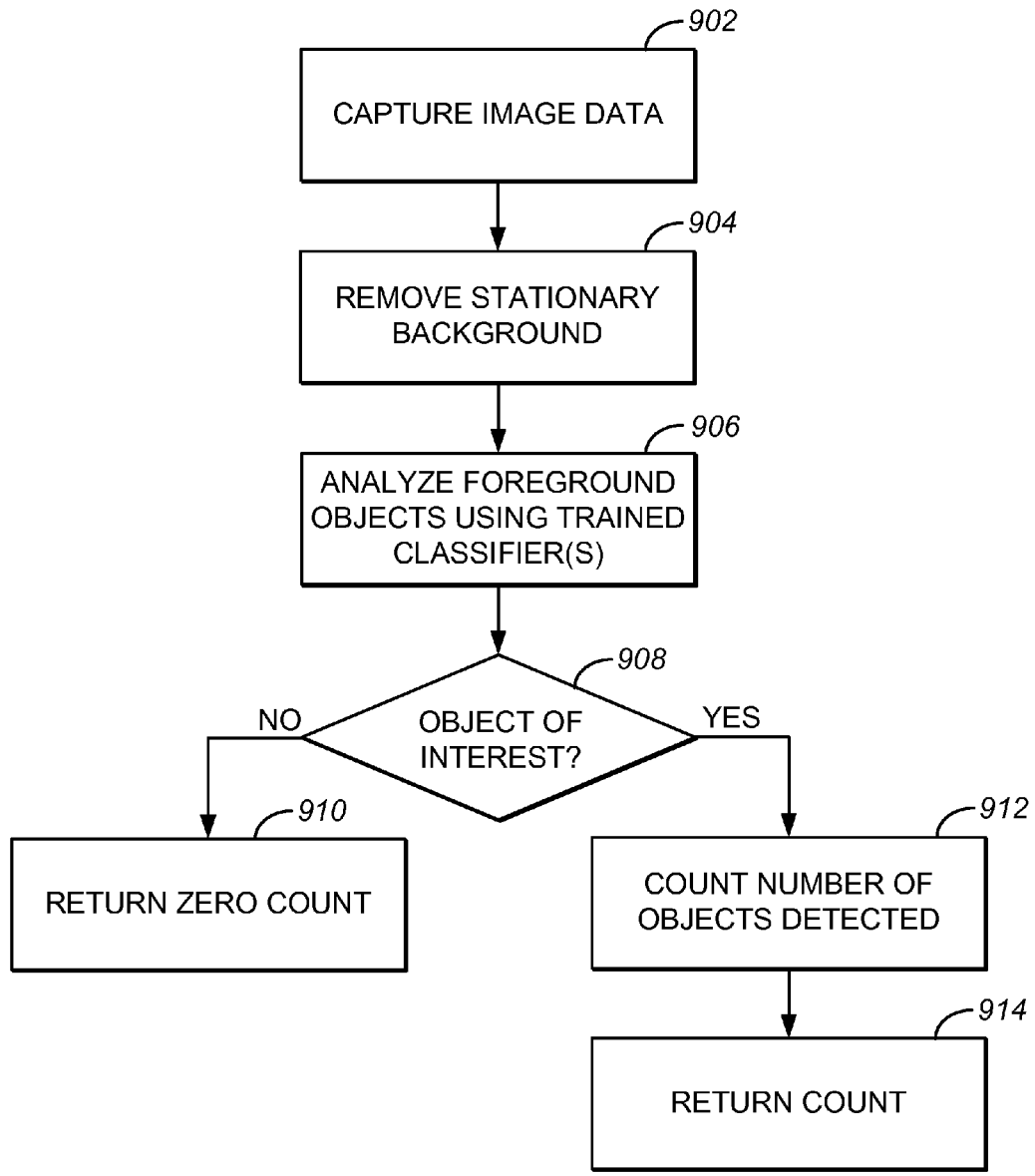
FIG. 9 illustrates an example process for counting objects of interest that can be utilized in accordance with various embodiments.

As mentioned, such drones and backend systems can work together to provide various data determined using image and/or sensor data captured from one or more cameras. FIG. 9 illustrates one example process 900 for returning a count of objects of interest in a determined area or region that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, image data is captured 902 using one or more cameras on a drone or other such unmanned aerial vehicle. As mentioned, the image data can be stored on the drone and/or transmitted to a remote system or service for analysis. As part of the analysis, the stationary background region can be determined and removed 904 or otherwise excluded from the object recognition process. Motion and/or orientation data from one or more sensors of the drone can be used to account for motion effects in the image data due to motion of the drone during the capture process. If the image data is video data, key frames or other video frames can be selected for analysis, at least on the drone. The remaining foreground objects can be analyzed 906 by a computer vision process using one or more classifiers trained on data for the particular types of objects of interest. These can include, for example, people, animals, and types of vehicle, among other options discussed and suggested herein. Various other processes can be used to analyze the image data for the foreground objects as well within the scope of the various embodiments.

The computer vision process can generate determinations for the types of objects of interest, along with confidence scores for each determination. A minimum confidence threshold can be set in order to cause an object of interest to be classified as the type of object determined by the computer vision process. In some embodiments the drone can be configured to attempt to obtain additional image data or other information (i.e., heat or radio signatures) in order to increase the confidence score to a level that at least meets the threshold or another determination criterion. If no object of interest (of a type where interest has been designated) is determined 908 or located, then a zero count or other such result can be returned 910. This can occur, for example, when the drone is searching for an object such as a person in a canyon and is unable to locate a human in the region. If one or more objects are able to located, the number of such objects can be counted 912 or otherwise determined, and that count can be returned 914 or otherwise provided to the appropriate party. In some embodiments the results may be stored in a database or other repository for subsequent retrieval. As mentioned, in some embodiments a first, near-real time count can be performed on the drone for purposes of flight path determination, for example, while a second more accurate count can be determined offline that can provide more accurate results but requires more time and/or resource capacity. This can include, for example, analyzing at least some of the results with a truth verification process, which can use humans, neural networks, or other such approaches to verify that the determinations made for the objects were correct. Information about the truthfulness can be used to train the models or update the signatures, features, or patterns, used for object detection, motion prediction, and other such factors, as part of an iterative learning process. Other analysis can be performed on the data as discussed herein, such as may include pattern detection, motion path determination, incident detection, and the like.

Figure 10:
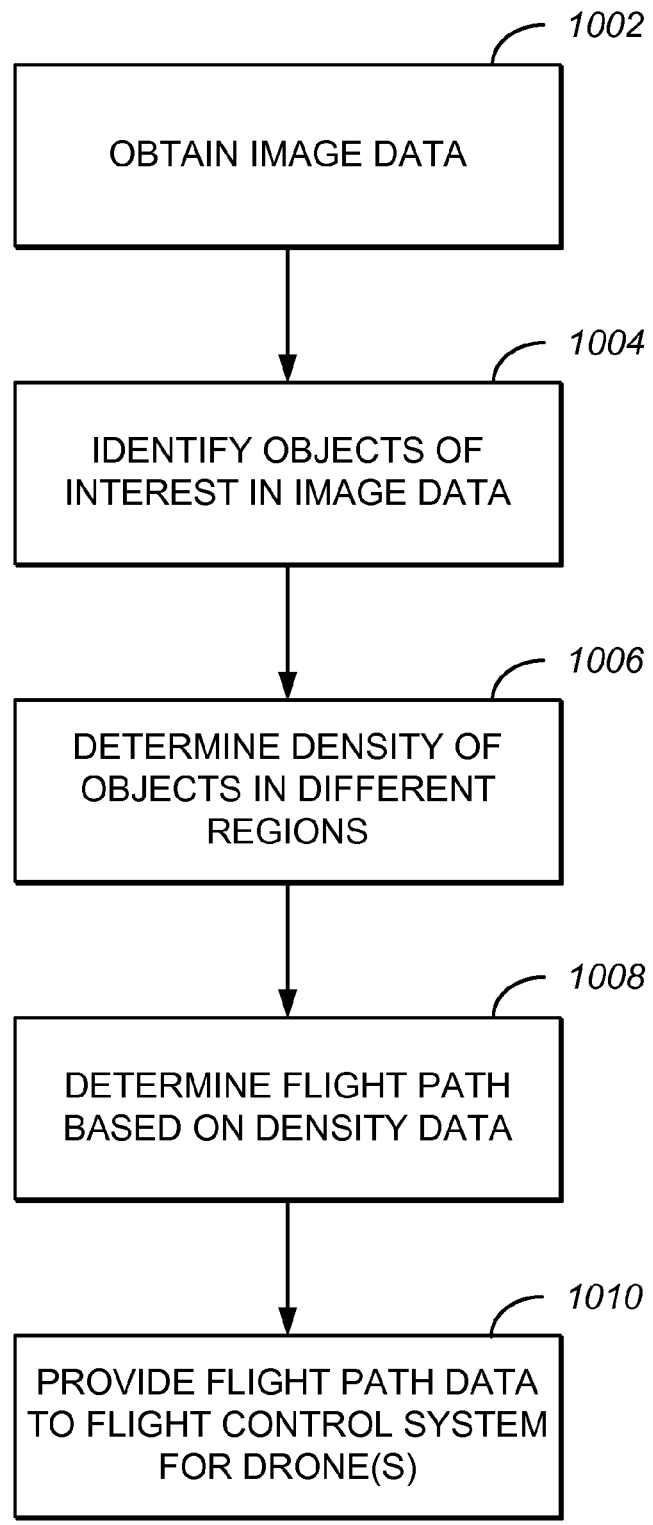
FIG. 10 illustrates an example process for determining a flight path for an unmanned aerial vehicle that can be utilized in accordance with various embodiments.

FIG. 10 illustrates an example process 1000 that can be used to determine the flight path of a drone in accordance with various embodiments, which can be used in conjunction with the process of FIG. 9. In this example, image data is obtained 1002 using at least one camera or sensor of the drone, such as discussed with respect to the process of FIG. 9. Objects of interest can be identified 1004 from the image data. This can include using a process such as described with respect to FIG. 9, wherein background and motion is accounted for in order to identify foreground objects, which can then be analyzed using a computer vision algorithm or similar process. In other embodiments, information about the locations of various objects of interest can be received from a process such as the object identification process of FIG. 9 as input. Object data can also be received from a remote system or service performing the determination or another such source. Once the locations or presence of the objects of interest are located, the density of the objects of interest in different regions can be determined 1006. The flight path can then be determined 1008 or modified based at least in part upon the density data. For example, if there is no density that exceeds a density threshold or no variation in density that meets a determined criterion then the flight path may not be modified, and may continue along a determined path that may take into account object location, no fly zones, crash avoidance, and path guidance instructions, among other such options. If there is a density or density variation that meets a determined threshold or variation criteria, then the flight path can be modified based at least in part upon this information. For example, if a crowd of people is gathered at a particular location or a group of vehicles is determined to be congested at a particular intersection, the flight path can be modified to cause the drone to move to get a better view of the location, which can include flying over and/or near the location in order to capture more detailed image data for further analysis. In at least some embodiments the factors used in determining the flight path can be weighted, such that crash avoidance can be more important in determining the flight path than getting an optimal camera view of a person, for example. The flight path data can then be provided 1010 to the flight path control system, either from a processor on the drone itself or from a remote system or server, among other such options. As mentioned, flight path modification data provided from a remote system or source can still be overridden by crash avoidance systems or other such systems on the drone itself. For regions with a very high density of objects, particularly where those objects have relatively small representations in the image data, Fourier transforms and other such data manipulations and analyses can be used to obtain information about the high density objects, as well as quick changes in vision and other such occurrences.

The ability to capture and analyze data on the drone for purposes of determining the flight path can help to improve the performance of the drone and/or the drone control system. For example, the ability to perform at least a rough analysis on the drone enables the drone to make real time flight decisions without having to wait for data to be communicated to, processed by, and received from a remote system or service. This reduces flight time, which conserves resources such as battery power and motor usage. The ability to determine flight paths on the drone also enables sufficient image data to be obtained to perform the desired task, such as counting or locating objects of interest, even if an adequate wireless signal is unavailable. The ability to detect objects or occurrences such as fires can also help to avoid damage to the drone and other such issues.

In addition to many of the examples and uses presented above, the ability to locate and determine counts, density, and motion of objects of interest can be used to obtain information for various events as well. For example, during an occurrence such as a parade, riot, or flash mob, drones can use this information to identify where the objects of interest are most likely to be, and can follow those objects (or move towards a location from which those objects are moving) and count them along the way. If a drone has a designated portion of a parade route, for example, the drone can use object recognition to determine the presence of bands, floats, and other such objects or groups of objects in order to fly towards those objects to obtain image data and other such information. Similar uses can be found for events such as marathons and triathlons, where the drones can determine the number of athletes, the density of athletes at various locations along the route, patterns of motion, crowd locations or movements, spectator count, and other such information. For spontaneous events or occurrences, such as riots, flash mobs, or other unplanned gatherings, the drones can analyze the pattern of motion to determine potential locations of interest as discussed elsewhere herein. Other types of data can assist in this determination, as sounds such as yelling, screaming, gun shots, or other such sounds can be indicative of a certain type of occurrence. Similarly, a sudden huge increase in the number of phone calls being made, or messages being sent, can be indicative of an event of interest.

In some embodiments a group of drones can perform a statistical survey, where a higher flying drone can identify areas with high, medium, and low density groups and one or more lower flying drones can count the population in each group. The results from the lower drones can be used to calibrate the higher flying drone's counting process for greater precision.

While for purposes such as covering sporting events and parades the density and other information may be useful for moving towards groups of people, the density, count, and motion information can also be useful for avoiding areas with crowds of people for safety, privacy, annoyance, and other such concerns. For example, a drone can be instructed to fly along a route in a specified region, where the route is more of a "guideline" and the drone is able to deviate from that path up to a specified amount, where the drone is to avoid people to the extent possible. This can include flying to one side of the flight path or the other, changing direction along the path, covering different parts of the path at different times, or other such actions. If the drone does not have a specific path in the region, then the flight path can be determined to capture the necessary image data for the region but do so while following a path that minimizes, to the extent possible, the proximity of the drone to humans, dwellings, vehicles, or other identified objects in that region. This information also can be fed to other drones to help them adjust their flight paths as appropriate. In the event that the drone must make an unexpected landing, such as may be due to a loss of power or problem with a rotor engine, for example, the density determinations can also be used to determine an optimal (or at least preferred) location to land the drone. The ability to select an area that is away from the majority of people in an area can help to reduce the potential safety risks, as well as to reduce the fear or concern of people in the area should a drone have to land unexpectedly.

As the resolution of cameras increases and the accuracy of object recognition from drones increases, the counting of other types of objects can be performed as well within the scope of the various embodiments. For example, a drone-enabled approach can be configured to count the occurrence of items such as shopping bags with a store logo, shoes with a brand logo, coffee cups with particular logos or designs, and even particular types of products for purposes of tracking locations and density of customers in certain areas, for purposes such as determining where to place advertising or stores. Drones can also be configured to identify things like weapons or illegal objects for purposes of safety and security. Once the appropriate trained classifiers, HOG descriptors, or other elements are available for the particular type of object, various approaches discussed and suggested herein can be used to perform various types of operations with respect to those types of objects.

Figure 11:
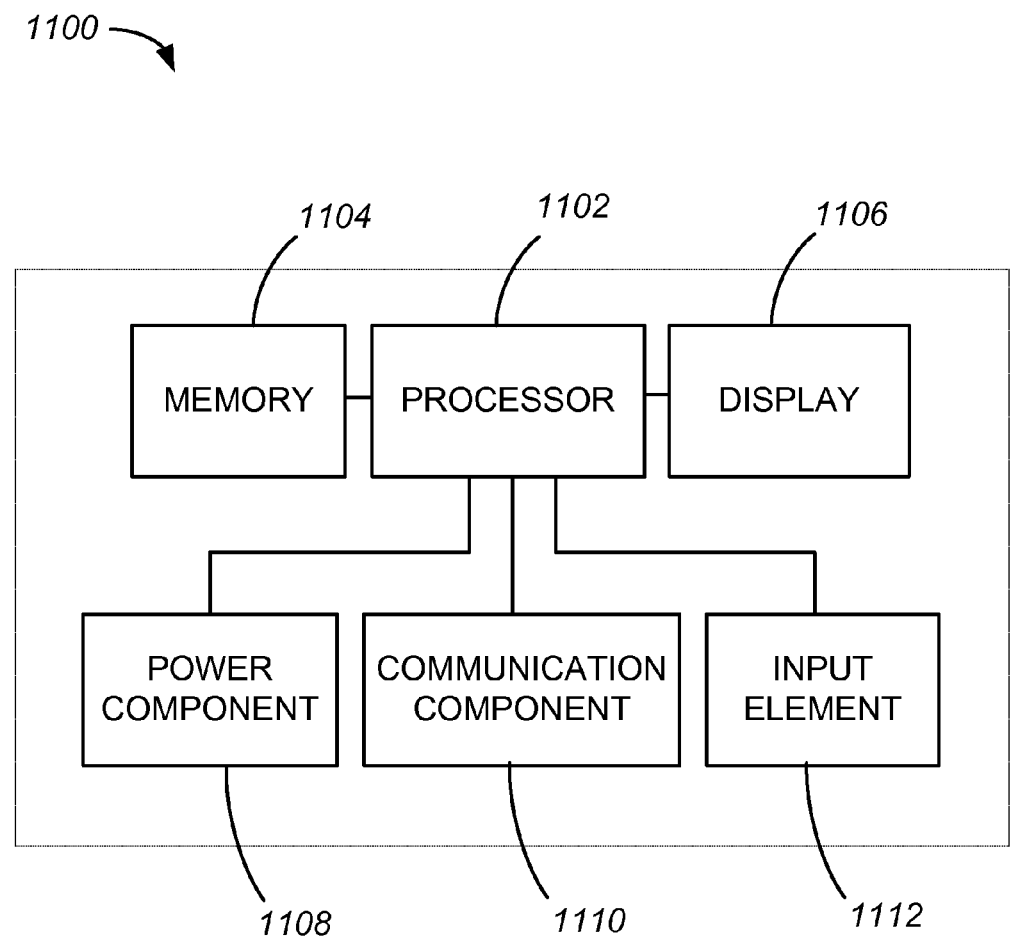
FIG. 11 illustrates components of an example computing device that can be utilized to implement aspects of the various embodiments.

FIG. 11 illustrates a set of basic components of an example computing device 1100 that can be used to implement aspects of the various embodiments, such as to analyze image data or generate flight path data to be communicated to a drone, among other such options. In this example, the device includes at least one processor 1102 for executing instructions. The instructions can be received from a remote source and/or stored in a memory element 1104 of the computing device. A device can include many types of memory, data storage or computer-readable media, with the memory being fixed or removable in various embodiments. The device typically will include at least one display element 1106, such as a touch-sensitive display screen, organic light emitting diode (OLED) or liquid crystal display (LCD). The device can include at least one communication component 1108, as may enable wired and/or wireless communication of voice and/or data signals over a network such as a cellular network, a radio network, the Internet, a Wi-Fi network, BLUETOOTH®, and the like. The device can include at least one additional input device 1110 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might be controlled only through a combination of visual and audio commands such that a user can control the device without having to be in contact with the device.

Client devices used to perform aspects of various embodiments can include any appropriate devices operable to send and receive requests, messages, or information over an appropriate network and convey information back to a user of the device. Examples of such client devices include personal computers, smart phones, handheld messaging devices, wearable computers, laptop computers, and the like. The network can include any appropriate network, including an intranet, the Internet, a cellular network, a local area network (LAN), or any other such network or combination thereof. Components used for such a system can depend at least in part upon the type of network and/or environment selected. Protocols and components for communicating via such a network are well known and will not be discussed herein in detail. Various aspects can be implemented as part of at least one service or Web service, such as may be part of a service-oriented architecture. In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any appropriate programming language.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A device for monitoring motion of objects of interest, comprising:
    a vehicle body;
    a flight mechanism for enabling the vehicle body to be directed along an aerial flight path;
    at least one camera;
    at least one device sensor including at least one of an orientation sensor or a motion sensor;
    at least one processor; and
    memory storing instructions that, when executed by the at least one processor, cause the device to:
        capture, as the device follows at least a portion of the aerial flight path during a period of time, image data using the at least one camera, the portion of the aerial flight path selected such that an area of interest is within a field of view of the at least one camera during the period of time;
        determine device motion data for the device, over the period of time, using data from the at least one device sensor;
        analyze, using the at least one processor, the image data to recognize instances of at least two types of objects of interest represented in the image data and corresponding to the area of interest, the at least two types of objects of interest including: at least one of a motorized vehicle or other motorized transportation and at least one of a pedestrian, animal, or-non-motorized transportation, each type of the at least two types of objects identified by a respective type classifier;
        determine a number of the instances of the at least two types of objects of interest represented in the image data, each of the number of instances having an associated confidence level for recognition based at least in part on the respective type classifier;
        determine, based at least in part on the number of instances and the respective type classifier, a respective path of motion for each of at least a subset of the instances over the period of time, the respective path of motion determined using the device motion data to account for motion effects in the image data resulting from movement of the device; and
        transmit information about the number of instances of the at least two types of objects of interest and the respective path of motion for the area of interest over the period of time.

2. The device of claim 1, wherein the instructions when executed further cause the device to:
    determine a sub-region within the area of interest where at least one object of interest has an associated confidence level that falls below a minimum confidence threshold; and
    modify the aerial flight path to cause the camera to capture more detailed image data for the at least one object of interest.

3. The device of claim 1, wherein the instructions when executed further cause the device to:

transfer the image data to a data analysis system for subsequent analysis, the data analysis system configured to use a deep neural network-based analysis process to generate a second determination of the number of instances of the at least one type of object of interest, the data analysis system configured to provide updated training data to the device based at least in part from the second determination.

4. The device of claim 1, further comprising:
a signal sensor capable of detecting signal information from at least a subset of the instances of at least one type of object of interest, the determining of at least one of the number of the instances or the respective path of motion being based at least in part upon the signal information.

5. The device of claim 1, wherein the instructions when executed further cause the device to:
determine, based at least in part upon location data and the respective path of motion for the instances of the objects of interest, an irregular object behavior;
sending a notification regarding the irregular object behavior; and
attempting to capture additional image data regarding the irregular object behavior.

6. The device of claim 5, wherein the irregular object behavior corresponds to at least one of a demonstration, a riot, a flash mob, an accident, an emergency, or a point of congestion.

7. The device of claim 5, wherein the device is a first unmanned aerial vehicle (UAV), and wherein the notification is sent to at least one other UAV in order to cause the at least one other UAV to move toward a location of the irregular object behavior for purposes of capturing additional image data corresponding to the irregular object behavior.

8. A method of determining instances of objects of interest, comprising:
capturing, using a device sensor of an unmanned aerial vehicle (UAV), sensor data for an area of interest;
analyzing, using at least one processor of the UAV, the sensor data to recognize instances of objects of interest represented in the sensor data, the instances recognized using at least one object recognition algorithm executed by the at least one processor of the UAV, the instances recognized by a plurality of instance types, each instance type of the plurality of instance types identified by a respective type classifier;
determining at least one of a number of the instances or a respective location of each of the instances of the objects of interest within the area of interest;
determining, based at least in part on the number of instances and the respective type classifier, a respective path of motion for each of at least a subset of the instances, the respective path of motion determined using the sensor data to account for motion effects in the image data resulting from movement of the device; and
providing summary data including information based at least in part on the number of instances, each instance type based on the respective type classifier, the respective path of motion, or the respective locations within the area of interest.

9. The method of claim 8, further comprising:
capturing the sensor data over a period of time;
determining the respective paths of motion for the objects of interest over the period of time; and
including information about the respective paths of motion over the period of time in the summary data.

10. The method of claim 8, further comprising:
analyzing the one or more paths of motion to determine a location of an occurrence associated with the paths of motion, and
causing the UAV to fly along a flight path enabling the camera to capture additional sensor information corresponding to the location of the occurrence.

11. The method of claim 10, wherein the occurrence is one of a parade, a demonstration, a spontaneous gathering, a traffic flow, traffic congestion, an accident, a flash mob, a concert, a riot, a fire, or a deviation from an expected pattern of object motion.

12. The method of claim 8, further comprising:
sending instruction data to at least a second UAV to cause the second UAV to capture a different set of sensor data with respect to the area of interest.

13. The method of claim 8, further comprising:
capturing additional sensor data using at least a second sensor on the device, the additional sensor data including at least one of heat signature data, radio frequency data, audio data, or motion data; and
using the additional sensor data to determine the at least one of a number of the instances or a respective location of each of the instances of the objects within the area of interest.

14. The method of claim 8, further comprising:
determining, using at least one of an orientation sensor or a motion sensor, motion data for the UAV over a period of time in which the sensor data is captured; and
using the motion data to account for changes in positions of the objects of interest in the sensor data that correspond to movement of the UAV.

15. The method of claim 8, further comprising:
modifying a flight path of the UAV based at least in part upon at least one of a density, a movement, a number, or an unexpected action of at least a subset of the objects of interest.

16. The method of claim 8, wherein the sensor data includes at least one of heat signature data, radio frequency data, audio data, motion data, ambient light image data, infrared image data, or stereoscopic image data.

17. A method of monitoring objects of interest in a designated area, comprising:
determining a regular flight path for an unmanned aerial vehicle (UAV) in order to enable a camera of the UAV to have at least a portion of the designated area in a field of view over a period of time for the monitoring;
capturing, using the camera, image data corresponding to the designated area;
performing a first analysis of the image data to recognize objects of interest located within the designated area, the objects of interest recognized by a plurality of types, each type of the plurality of types identified by a respective type classifier;
determining, based at least in part on the number of instances and the respective type classifier, a respective path of motion for each of at least a subset of the objects of interest, the respective path of motion determined using the regular flight path to account for motion effects in the image data resulting from movement of the device;
based at least in part upon at least one of: the respective type classifier, a location, or the respective path of motion of each of the at least the subset of the objects of interest, modifying the regular flight path to enable capturing of additional image data enabling increased accuracy of recognition of the one or more objects of interest within the area of interest; and transmitting report data, based at least in part on the respective type classifier, indicating at least one of a number, a location, a density, or the respective path of motion of each of the at least the subset of the objects of interest within the designated area over the period of time.

18. The method of claim 17, further comprising:

transmitting the image data to a processing system, whereby the processing system is enabled to perform a second analysis of the image data using a more robust object detection algorithm to generate a more accurate recognition of objects of interest represented in the image data.

19. The method of claim 17, wherein the report data includes at least one of types of traffic, congestion points, patterns of motion, changes in traffic patterns over time, different paths of motion for different types of objects, unusual movements, and unexpected occurrences.

20. The method of claim 17, wherein the report data is updated over time for the designated area as part of a subscription service to which a customer has subscribed, the customer enabled to specify at least one of the designated area, the period of time, a frequency of reporting, and one or more types of the objects of interest.

21. The method of claim 17, wherein image data from a plurality of UAVs is aggregated before analysis, the image data representing different viewpoints and capable of being used to generate three-dimensional representations of at least a subset of the designated region and the objects of interest.

22. The method of claim 17, further comprising:

determining, using the image data, a state of one or more traffic signals in the designated area; and determining different patterns of motion of different types of objects for each of the states and for each of the traffic signals in the designated areas, the different patterns of motion being included in the report data.

* * * * *